(12) United States Patent
Seidel et al.

(10) Patent No.: US 12,362,865 B2
(45) Date of Patent: Jul. 15, 2025

(54) HARQ PROCESS / ENTITY BASED UPLINK MULTIPLEXING

(71) Applicant: KONINKLIJKE PHILIPS N.V., Eindhoven (NL)

(72) Inventors: Eiko Seidel, Sauerlach (DE); Baris Göktepe, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 394 days.

(21) Appl. No.: 17/711,529

(22) Filed: Apr. 1, 2022

(65) Prior Publication Data

US 2022/0224447 A1   Jul. 14, 2022

Related U.S. Application Data

(63) Continuation of application No. PCT/EP2020/077410, filed on Sep. 30, 2020.

(30) Foreign Application Priority Data

Oct. 2, 2019   (EP) .................................... 19201124

(51) Int. Cl.
*H04L 1/1812* (2023.01)
*H04L 1/1822* (2023.01)
(Continued)

(52) U.S. Cl.
CPC .......... *H04L 1/1812* (2013.01); *H04L 1/1822* (2013.01); *H04L 1/1887* (2013.01); *H04W 72/23* (2023.01)

(58) Field of Classification Search
CPC ... H04L 1/1812; H04L 1/1822; H04L 1/1887; H04L 1/1864; H04L 1/1867;
(Continued)

(56) References Cited

U.S. PATENT DOCUMENTS 10,827,502 B2   11/2020   Basu Mallick et al.
11,425,752 B2   8/2022   Adjakple et al.
(Continued)

FOREIGN PATENT DOCUMENTS

WO   2007/079058 A2   7/2007

OTHER PUBLICATIONS

3GPP TSG RAN WG1 Meeting #97; R1-1907763; Source: Huawei; Title: Summary of Monday offline discussion on PDCCH enhancements; Reno, USA, May 13-17, 2019. (Year: 2019).*
(Continued)

*Primary Examiner* — Mohammed S Chowdhury

(57) ABSTRACT

Embodiments provide an apparatus, wherein the apparatus includes
a plurality of Hybrid ARQ, HARQ, entities, each of the plurality of HARQ entities configured to operate a HARQ process associated with one of a plurality of HARQ behaviors, the plurality of HARQ behaviors being different, and/or
a Hybrid ARQ, HARQ, entity configured to operate a plurality of HARQ processes, each HARQ processes associated with one of a plurality of HARQ behaviors, the plurality of HARQ behaviors being different,
wherein the apparatus is configured to receive a control information from a transceiver in a wireless communication system, the control information transmitted over a radio channel of the wireless communication system, the control information including a Hybrid ARQ, HARQ, identifier identifying one HARQ behavior out of the plurality of
(Continued)

HARQ behaviors or one HARQ process out of the plurality of HARQ processes, the one HARQ process associated with a HARQ behavior.

20 Claims, 17 Drawing Sheets

(51) Int. Cl.
   *H04L 1/1867* (2023.01)
   *H04W 72/23* (2023.01)
(58) Field of Classification Search
   CPC ... H04L 1/1896; H04L 1/1861; H04L 1/1628; H04L 1/1854; H04W 72/23
   See application file for complete search history.

(56) References Cited

U.S. PATENT DOCUMENTS

| | | | |
|---|---|---|---|
| 2014/0362832 A1* | 12/2014 | Rudolf | H04L 5/0007 370/336 |
| 2015/0124740 A1* | 5/2015 | Chen | H04L 5/001 370/329 |
| 2016/0050060 A1 | 2/2016 | Seo et al. | |
| 2018/0007662 A1 | 1/2018 | Chai et al. | |
| 2018/0145798 A1* | 5/2018 | Suzuki | H04L 43/0864 |
| 2018/0279358 A1 | 9/2018 | Babaei et al. | |
| 2018/0375621 A1* | 12/2018 | Turtinen | H04L 1/0003 |
| 2019/0150176 A1 | 5/2019 | Pelletier et al. | |
| 2019/0182853 A1* | 6/2019 | Yi | H04L 5/0048 |
| 2020/0099475 A1* | 3/2020 | Amuru | H04L 27/26025 |
| 2020/0195344 A1 | 6/2020 | Jungnickel et al. | |
| 2021/0014010 A1* | 1/2021 | Babaei | H04W 72/0446 |
| 2021/0099254 A1* | 4/2021 | Babaei | H04L 1/1887 |
| 2021/0167897 A1 | 6/2021 | Seidel et al. | |
| 2021/0282137 A1* | 9/2021 | Wang | H04L 5/0055 |
| 2022/0294572 A1* | 9/2022 | Wu | H04L 1/1822 |
| 2022/0353899 A1* | 11/2022 | Xiao | H04W 72/23 |

OTHER PUBLICATIONS

3GPP TSG RAN WG1 Meeting NR#3; R1-1716005 ; Source: Samsung; Title: HARQ Management and Feedback; Nagoya, Japan, Sep. 18-21, 2017 (Year: 2017).*
Samsung, "Layer 2 Design for Multiple Services (Numerologies)", vol. RAN WG2, No. Reno, USA; Nov. 14, 2016-Nov. 18, 2016, (Nov. 14, 2016), 3GPP Draft; R2-168851_Layer 2 Design for Multiple Services (Numerologies), 3rd Generation Partnership Project (3GPP), Mobile Competence Centre ; 650, Route Des Lucioles ; F-06921 Sophia-Antipolis Cede, URL: http://www.3gpp.org/ftp/Meetings_3GPP_SYNC/RAN2/Docs/, Nov. 14-18, 2016.
CATT, "Handling of Dropped MAC PDU", vol. RAN WG2, No. Prague, Czech Republic; Aug. 26, 2019-Aug. 30, 2019, (Aug. 16, 2019), 3GPP Draft; R2-1908831, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG2_RL2/TSGR2_107/Docs/R2-1908831.zip, Aug. 26-30, 2019.
Institute for Information Industry (III), "Intra-UE prioritization for conflict UL grants", vol. RAN WG2, No. Prague, Czech Republic; Aug. 26, 2019-Aug. 30, 2019, (Aug. 16, 2019), 3GPP Draft; R2-1911123_Intra-UE Prioritization for Conflict UL Grants, 3rd Generation Partnership Project (3GPP), Mobile Competence Centre ; 650, Route Des Lucioles ; F-06921 Sophia-Antipolis Cedex ;, URL: http://www.3gpp.org/ftp/tsg_ran/WG2_RL2/TSGR2_107/Docs/R2-1911123.zip, Aug. 26-30, 2019.
3GPP TS 38.331 V15.7.0, "3rd Generation Partnership Project; Technical Specification Group Radio Access Network; NR; Radio Resource Control (RRC) protocol specification", Sep. 2019.

* cited by examiner

HARQ PROCESS / ENTITY BASED UPLINK MULTIPLEXING

CROSS-REFERENCES TO RELATED APPLICATIONS

This application is a continuation of copending International Application No. PCT/EP2020/077410, filed Sep. 30, 2020, which is incorporated herein by reference in its entirety, and additionally claims priority from European Application No. EP 19 201 124.5, filed Oct. 2, 2019, which is incorporated herein by reference in its entirety.

BACKGROUND OF THE INVENTION

The present invention relates to the field of mobile communication systems, more specifically to techniques checking or verifying if information sent by a transmitter has been correctly received at a receiver so as to initiate a retransmission in case of a non-successful transmission of the information. Embodiments relate to HARQ, hybrid automatic repeat request, operations in a network entity of the wireless communication system, like a base station or a user equipment, UE. Some embodiments relate to HARQ, hybrid automatic repeat request, process/entity based uplink multiplexing.

FIGS. 1A and 1B are schematic representations of an example of a terrestrial wireless network 100 including, as is shown in FIG. 1A, a core network 102 and one or more radio access networks $RAN_1$, $RAN_2$, ... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1B by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIGS. 1A and 1B may be a heterogeneous network having distinct overlaid networks, e.g., a network of macro cells with each macro cell including a macro base station, like base station $gNB_1$ to $gNB_5$, and a network of small cell base stations (not shown in FIGS. 1A and 1B), like femto or pico base stations.

In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIGS. 1A and 1B, for example in accordance with the LTE-Advanced Pro standard or the 5G or NR, new radio, standard.

In mobile communication networks, for example in a network like that described above with reference to FIGS. 1A and 1B, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIGS. 1A and 1B. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIGS. 1A and 1B, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 140 which, basically, corresponds to the cell schematically represented in FIGS. 1A and 1B. The UEs directly communicating with each other include a first vehicle 142 and a second vehicle 144 both in the coverage area 140 of the base station gNB. Both vehicles 140, 142 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 152, 154, 156 are shown directly communicating with each other over a sidelink, e.g., using the PC5 interface. The scheduling and/or interference management of the V2V traffic is based on algorithms implemented between the vehicles. This configuration is also referred to as a mode 4 configuration. As mentioned above, the scenario in FIG. 3 which is an out-of-coverage scenario does not mean that the respective mode 4 UEs are outside of the coverage 140 of a base station, rather, it means that the respective mode 4 UEs are not served by a base station or are not connected to the base station of the coverage area. Thus, there may be situations in which, within the coverage area 140 shown in FIG. 2, in addition to the mode 3 UEs 142, 144 also mode 4 UEs 152, 154, 156 are present.

It is noted that the information in the above section is only for enhancing the understanding of the background of the invention and therefore it may contain information that does not form conventional technology that is already known to a person of ordinary skill in the art.

SUMMARY

An embodiment may have an apparatus, wherein the apparatus comprises a plurality of Hybrid ARQ, HARQ, entities, each of the plurality of HARQ entities configured to operate a HARQ process associated with one of a plurality of HARQ behaviors, the plurality of HARQ behaviors being different, or a Hybrid ARQ, HARQ, entity configured to operate a plurality of HARQ processes associated with one of a plurality of HARQ behaviors, the plurality of HARQ behaviors being different, wherein the apparatus is configured to transmit a control information to a transceiver in a wireless communication system, the control information transmitted over a radio channel of the wireless communication system, the control information comprising a Hybrid ARQ, HARQ, identifier identifying one HARQ behavior out of the plurality of HARQ behaviors or one HARQ process out of the plurality of HARQ processes, the one HARQ process associated with a HARQ behavior.

Another embodiment may have method having the steps of: providing a plurality of Hybrid ARQ, HARQ, entities, each of the plurality of HARQ entities operating a HARQ process associated with one of a plurality of HARQ behaviors, the plurality of HARQ behaviors being different, or a Hybrid ARQ, HARQ, entity operating a plurality of HARQ processes, each HARQ processes associated with one of a plurality of HARQ behaviors, the plurality of HARQ behaviors being different, transmitting a control information from a transceiver in a wireless communication system, the control information transmitted over a radio channel of the wireless communication system, the control information comprising a Hybrid ARQ, HARQ, identifier identifying one HARQ behavior out of the plurality of HARQ behaviors or one HARQ process out of the plurality of HARQ processes, the one HARQ processes associated with a HARQ behavior.

Another embodiment may have an apparatus, wherein the apparatus comprises a plurality of Hybrid ARQ, HARQ, entities, each of the plurality of HARQ entities configured to operate a HARQ process associated with one of a plurality of HARQ behaviors, the plurality of HARQ behaviors being different, and/or a Hybrid ARQ, HARQ, entity configured to operate a plurality of HARQ processes, each HARQ processes associated with one of a plurality of HARQ behaviors, the plurality of HARQ behaviors being different, wherein the apparatus is configured to receive a control information from a transceiver in a wireless communication system, the control information transmitted over a radio channel of the wireless communication system, the control information comprising a Hybrid ARQ, HARQ, identifier identifying one HARQ behavior out of the plurality of HARQ behaviors or one HARQ process out of the plurality of HARQ processes, the one HARQ process associated with a HARQ behavior.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings in which the same or similar elements have the same reference signs assigned.

In a wireless communication system as described above with reference to FIGS. 1A and 1B, like a LTE system or a 5G/NR system, UEs and/or base stations are configured to operate based on a communication protocol defined by respective protocol stacks. For illustration purposes, referring to FIG. 4, a base station protocol stack 120 is described.

Figure 4:
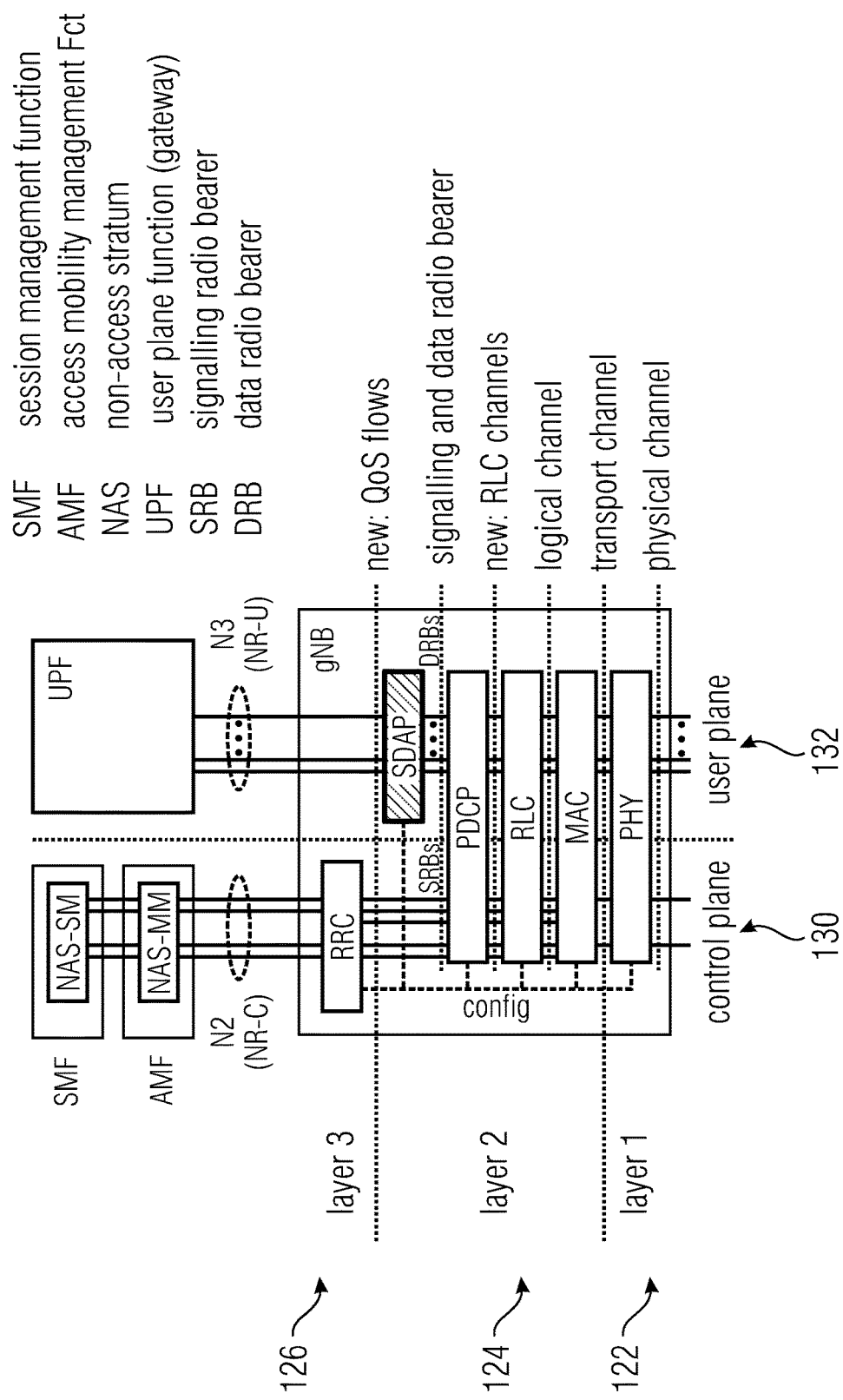
FIG. 4 illustrates a base station protocol stack.

As indicated in FIG. 4, the base station protocol stack 120 comprises a control plane protocol stack 130 and a user plane protocol stack 132, respectively comprising a first layer 122, a second layer 124 and a third layer 126.

The first layer 122 of both, the control plane protocol stack 130 and the user plane protocol stack 132, comprises a PHY, physical, layer. The second layer 124 of both, the control plane protocol stack 130 and the user plane protocol stack 132, comprises a MAC, medium access control, (sub-)layer, a RLC, radio link control, (sub-)layer, a PDCP, packet data convergence protocol, (sub-) layer and a SDAP, wherein the second layer 124 of the user plane protocol stack 132 further comprises a SDAP, service data adaption protocol, (sub-)layer. The third layer 126 of the control plane protocol stack 130 comprises a RRC, radio resource control, (sub-)layer, a SMF, session management function, and a AMF, access mobility management function. The third layer 126 of the user plane protocol stack 132 comprises a UPF, user plane function.

In FIG. 4, the different layer channels or elements are also indicated, such as physical channels of the first layer 122, transport channels, logical channels, RLC channels, signaling and data radio bearers and QoS flows of the second layer 124.

Further, in a wireless communication system as described above with reference to FIGS. 1A and 1B, like a LTE system or a 5G/NR system, approaches for checking or verifying if a transmission sent by a transmitter, like a BS, is correctly arrived at a receiver, like a UE, are implemented which request, in case of a non-successful transmission, a retransmission of the information or a retransmission of one or more redundancy versions of the information. Naturally, such a process may also be implemented when transmitting from the UE to the BS or when transmitting from the UE to another UE. In other words, for handling error packets received at a UE or a gNB, a mechanism is applied to rectify the error. In accordance with LTE or NR, a HARQ mechanism is implemented to correct error packets.

HARQ is a retransmission technique at the PHY/MAC layer (see FIG. 4) where erroneous packets are not discarded, but where the sampled soft values or soft bits or hard bits from the receive signal are stored and combined (in case of soft values or soft bits) with a retransmission of the same packet. If the receiver was not possible to decode a packet (e.g., CRC check failed), the receiver will store the packet in its buffer or soft buffer and will ask for a retransmission by sending a NACK. In LTE and NR, the ACK/NACKs are usually sent on the uplink PUCCH or on the sidelink PSFCH (physical sidelink feedback channel). The sender will receive the NACK and will transmit another version of the same packet. If the same code block is being send the scheme is called Chase Combining (CC), if a different code block (or redundancy version) is send the scheme is called Incremental Redundancy (IR).

Figure 5:
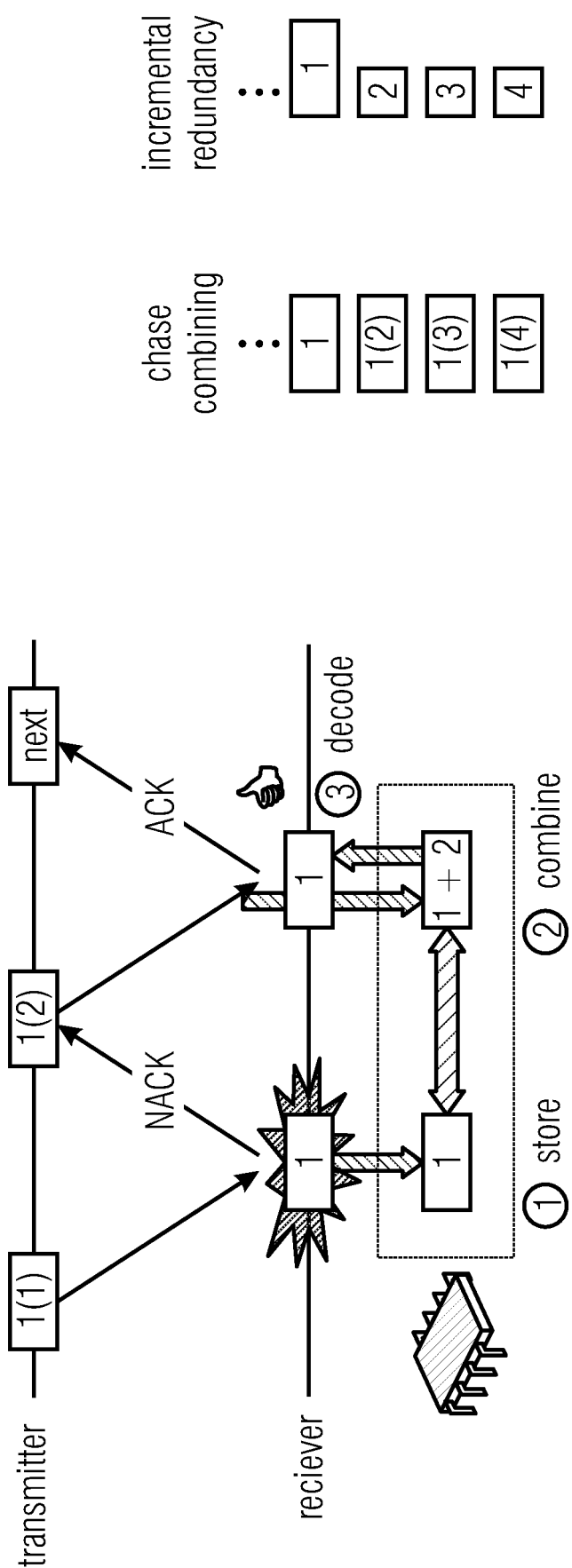
FIG. 5 describes briefly an example for a conventional HARQ mechanism as it may also be derived from TS 38.321, section 5.3.2 and 5.4.2 which describes the HARQ operation and entity.

FIG. 5 describes briefly an example for a conventional HARQ mechanism as it may also be derived from TS 38.321, section 5.3.2 and 5.4.2 which describes the HARQ operation and entity. FIG. 5 illustrates a transmitter, e.g., a gNB, which sends a data packet 1 to a receiver, e.g., a UE. The data packet 1(1) is initially transmitted, and the receiver attempts to decode the received data packet. If the data packet was successfully decoded the receiver delivers the data packet from the MAC/PHY layer to an upper layer (see FIG. 4). If the data packet was not successfully decoded the receiver buffers the data packet in a soft buffer as is indicate at ① in FIG. 5. Further, the receiver send the NACK message to the transmitter, and, responsive to the NACK message, the transmitter sends a retransmission 1(2) of the data packet. The buffered initial transmission is combined with the retransmission as is indicated at ②. The combining may use chase combination or incremental redundancy. In case the combined data can be decoded, as is indicated at ③, the ACK message is send to the transmitter to indicate the successful transmission.

To combine the old and the new transmission at the receiver, each packet has to be uniquely identified. In LTE and NR this HARQ information is send within the resource allocation of the downlink PDCCH channel.

LTE and NR are using an N-channel stop-and-wait HARQ scheme. In LTE 8 processes are used in NR up to 16 parallel HARQ processes (or channels) can be used. The same HARQ process can only be used again if an ACK was received. The process is identified by the HARQ process identifier (3 bits in case of 8 processes).

Figure 6:
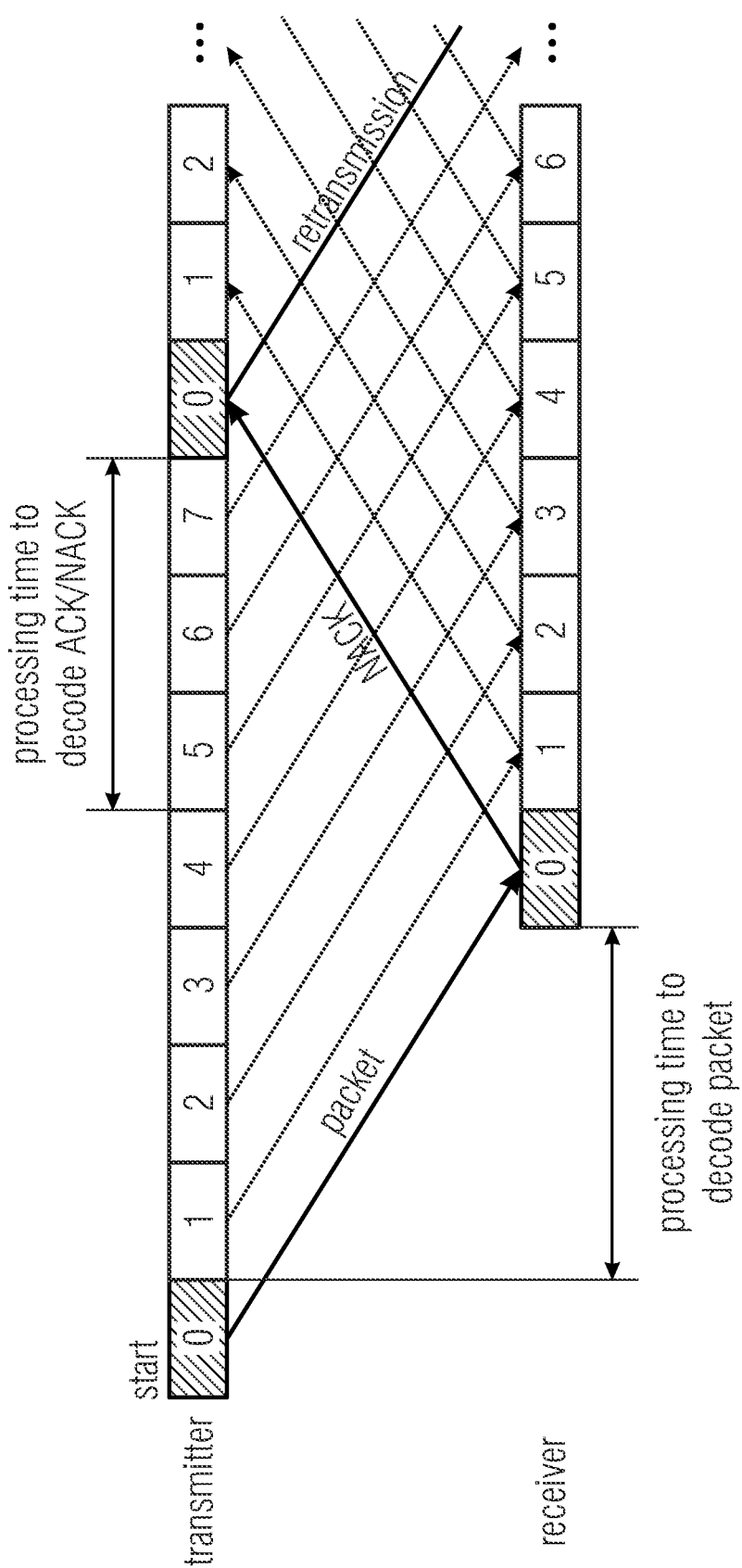
FIG. 6 illustrates an 8-channel Stop-and-Wait HARQ protocol according to which during a time period, which may be the minimum time until a retransmission may be send due to a missing ACK/NACK or due to received NACK, further data packets are transmitted.

FIG. 6 illustrates an 8-channel Stop-and-Wait HARQ protocol according to which during a time period, which may be the minimum time until a retransmission may be send due to a missing ACK/NACK or due to received NACK, further data packets are transmitted. In the latter case (receipt of a NACK) the time period is defined by the processing time for decoding at the receiver a data packet and the processing time at the transmitter for decoding the ACK/NACK message related to the data packet. The gNB provides instructions to the UE regarding which HARQ process will be used during each sub-frame for which resources are allocated, and the respective identity or HARQ process ID may be included within a PDCCH transmission. The asynchronous HARQ process come together with an increase in the signaling overhead as it needs to include the HARQ process ID within the DCI or SCI message, but increases flexibility as retransmissions do not have to be scheduled during every sub-frame.

In synchronous HARQ schemes, the HARQ processes are send in sequence as in FIG. 6. The process identity might also be tight to the Sequence Frame Number to save overhead signalling in this case. LTE uplink is using synchronous HARQ. NR is using asynchronous HARQ where the scheduler decides which HARQ process is scheduled at which time.

Embodiments described herein are based on the assumption that HARQ processes/entities can be configured with different HARQ behavior, i.e. different HARQ behavior per HARQ process/entity.

In accordance with embodiments, synchronous HARQ can be implemented, for example, for low latency services, like URLLC, in NR. More specifically, in the uplink, scheduling each transmission of the PDCCH leads to an additional delay, and also in the downlink extra complexity is required which needs to be avoided for URLLC services. Also, feedback bundling, which increases the spectral efficiency and reliability of the feedback channel, has the drawback of providing for additional latency. In case of URLLC services, the feedback is required as fast as possible and, therefore, in accordance with embodiments, dedicated resources are used for the URLLC HARQ feedback. In the downlink, this corresponds to a HARQ indicator channel containing only the acknowledgement/non-acknowledgement message, ACK/NACK, and in the uplink two specific PUCCH resources which are used for the feedback or for the low-latency CSI, LL-CSI. In accordance with embodiments, multiple Hybrid ARQ, HARQ, entities, e.g., two or more HARQ entities preforming different HARQ operations, for example asynchronous HARQ for delay non-critical services, like eMBB services, and synchronous HARQ for delay critical services, like URLLC services.

In accordance with embodiments, the communication systems configures data flows across multiple layers with QoS flows, Signaling and Radio Bearers, RLC flows, Logical Channels, Transport Channels and Physical Channels. Services may correspond to QoS flows and are mapped to a Radio Bearer. HARQ may be located at the MAC and/or PHY layer and may not be aware about any actual service in the upper layer. The MAC layer may only know the logical channel the packet corresponds to so that a HARQ entity may be selected per Logical Channel.

In other words, embodiments provide for the possibility to simultaneously, i.e., at the same time, support synchronous and asynchronous HARQ operations thereby combining the advantages of the respective operations with respect to the service from which a transmission originates. For example, synchronous HARQ has the advantage that scheduling a retransmission does not require an extra PDCCH, thereby avoiding the consumption of additional time, especially for uplink transmissions and reducing the blind decoding burden. The synchronous HARQ operation uses a dedicated HARQ indicator channel for transmitting the ACK/NACK messages, and a NACK message automatically assigns a predefined resource for the retransmission, dependent on the initial transmission, i.e., no additional time is spent for scheduling resources for the retransmission. For example, a UE may use the synchronous HARQ operation when recognizing that a transmission originates from a latency critical service, like the URLLC service, or a low-complexity service, like the mMTC service, however, at the same time, the UE may also support transmissions from delay non-critical or regular complexity services, like the eMBB service, and for such transmissions, the UE may use the PDCCH for scheduling retransmissions asynchronously. For example, when applying the synchronous HARQ operation, a Stop&Wait HARQ mechanism may be used, while the asynchronous HARQ protocol may be selected and used for delay non-critical services.

Additionally, for downlink transmissions, a HARQ protocol may be used which employ regular channel state information feedback for delay non-critical transmissions, while another HARQ protocol using low latency CSI feedback channel may be used in case of latency critical services. These CSI feedbacks may be transmitted using the PUCCH using different formats.

Figure 7:
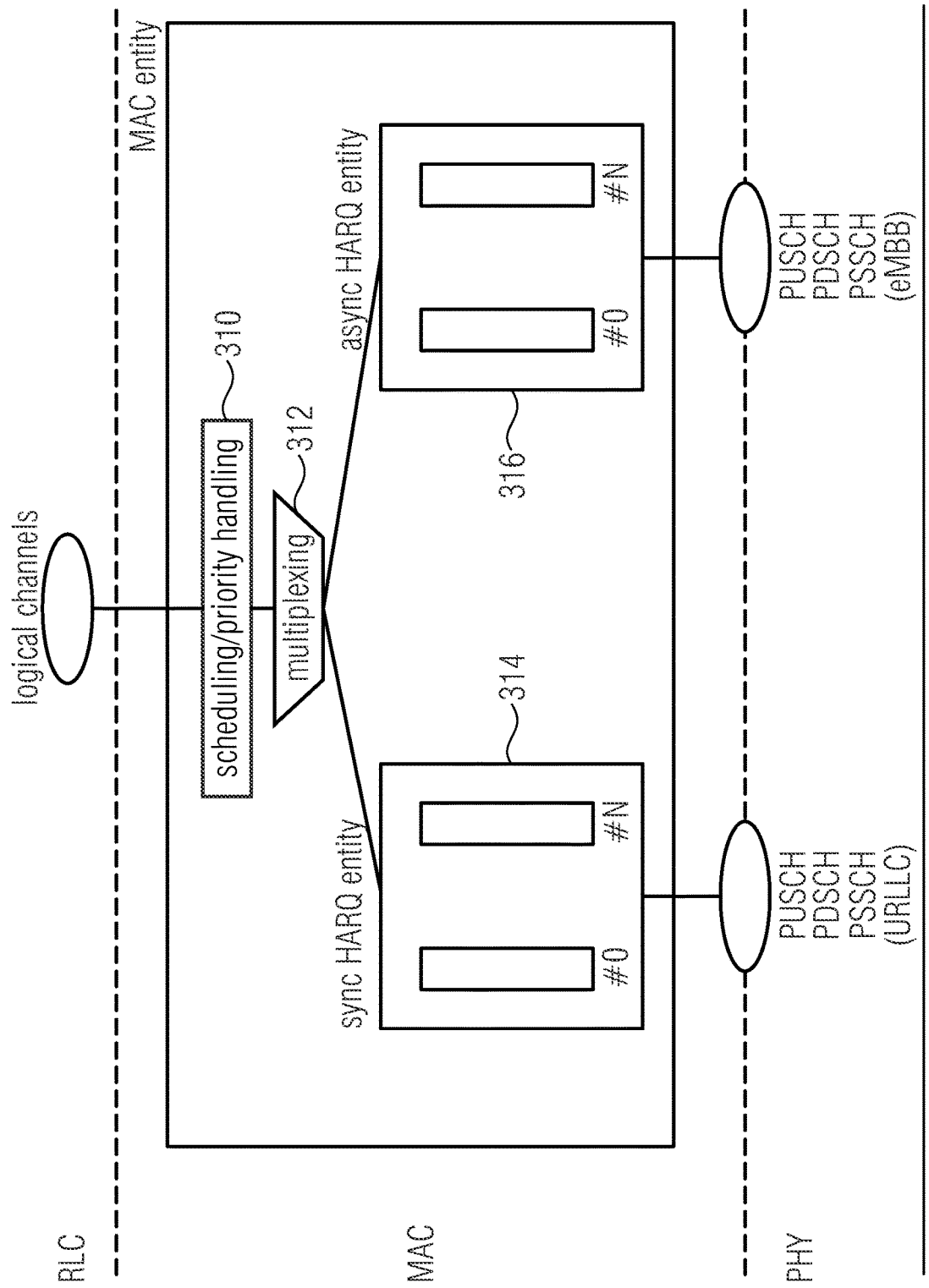
FIG. 7 illustrates an embodiment of a layer structure for implementing synchronous and asynchronous HARQ operation at the base station or the user equipment using a common MAC entity in the MAC layer.
Figure 8:
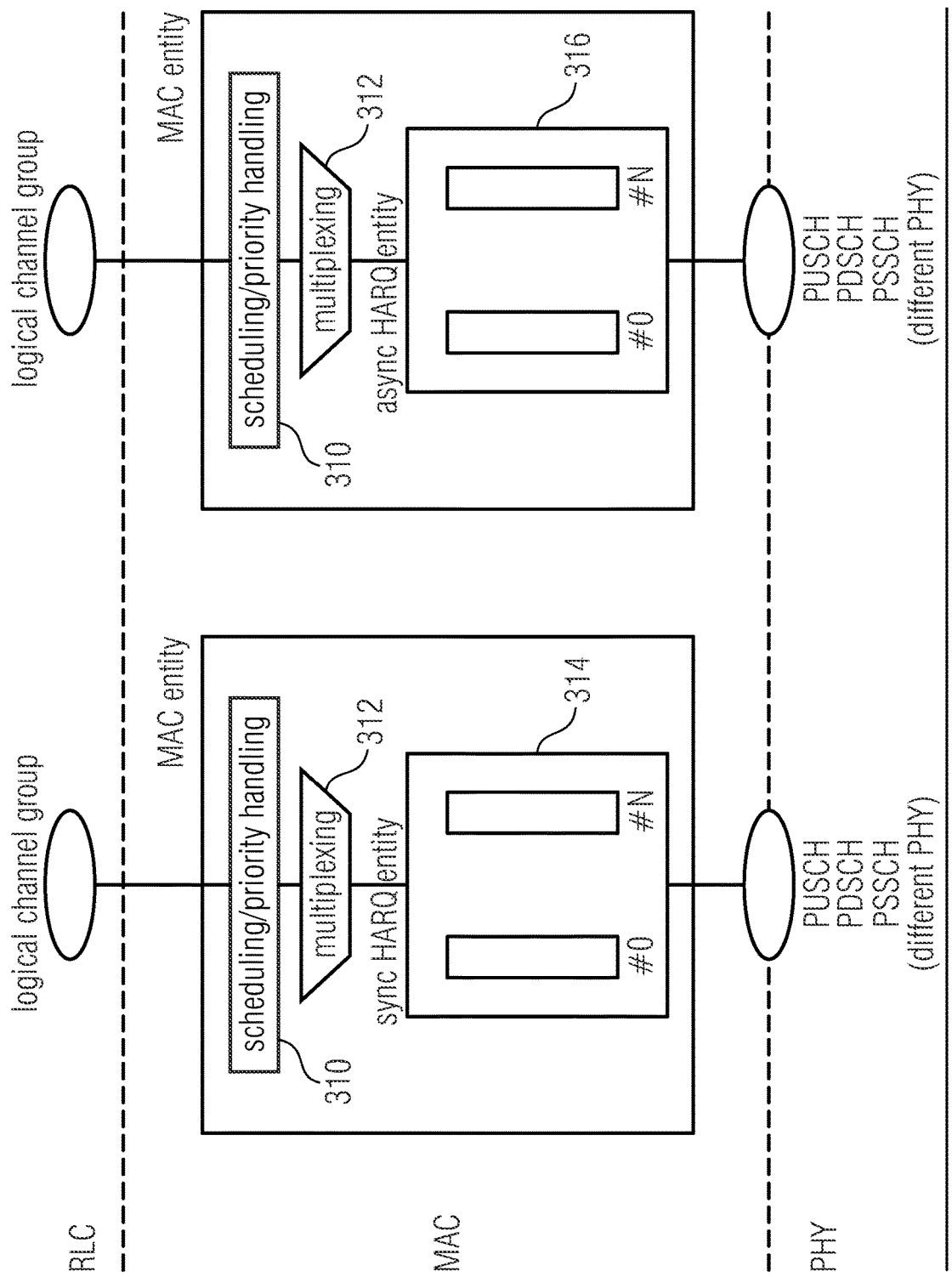
FIG. 8 illustrates a further embodiment of a layer structure for implementing synchronous and asynchronous HARQ operation at the base station or the user equipment using separate MAC entities in the MAC layer.

FIG. 7 illustrates schematically the layer 2 structure for implementing simultaneous synchronous and asynchronous HARQ operation at the base station or the user equipment in accordance with an embodiment. At the MAC layer, a MAC entity is provided which performs the scheduling/priority handling 310 and the multiplexing 312. The MAC entity further includes a synchronous HARQ entity 314 for a synchronous HARQ operation and an asynchronous HARQ entity 316 for an asynchronous HARQ operation so that dependent on the HARQ to be used either one or both of the HARQ entities 314, 316 may be applied or used for a transmission of one or more data packets. In accordance with other embodiments, rather than providing a single MAC entity including the HARQ entities 314, 316, multiple MAC entities may be provided, each including a HARQ entity, as is shown in FIG. 8. Additionally, a single HARQ entity may also support a synchronous and asynchronous HARQ operation at the same time, shifting the HARQ processes between the HARQ operation modes dynamically or by re-/configuration, e.g., RRC signaling.

Thus, embodiments provide network entities and methods supporting simultaneously or at the same time different retransmission protocols or procedures. Although reference is made to two retransmission procedures it is noted that embodiments are not limited to such a scenario, rather, more than two retransmission procedures may be supported simultaneously at the network entity. Further, embodiments are not limited to asynchronous and synchronous HARQ operations, rather, other retransmission procedures, like ARQ procedures may be implemented.

In accordance with embodiments, the HARQ protocols to be used may be semi-statically configured via the RRC protocol. The configuration may set the criteria according to which the UE or gNB chooses which HARQ protocol to use, for example on the basis of the service type, like eMBB, URLLC or mMTC, or on the basis of specific 5QI attributes, like delay or guaranteed bitrate, GBR.

In accordance with further embodiments, different HARQ entities may be used for each of the supported HARQ protocols. The HARQ entities may be configured by signaling or may be hard-coded in the standard. The different HARQ entities may use different logical channels, which are defined by a logical channel identity, and may use different physical channels, which are defined by different physical resources. The different physical resources may also use different sub-carrier spacing.

The different HARQ entities may use different target Block Error Rates, BLERs, for the different transmissions/retransmissions and may be associated with a different number of HARQ processes. Moreover, a different order of the redundancy versions, RVs, may be applied.

In accordance with further embodiments, the DCI signaling may be employed for distinguishing the HARQ entities/protocols. For example, the UE needs to determine for a received grant for a transmission which HARQ entity is to processed or which HARQ protocol is to be applied. This may be accomplished either by using the Radio Network Temporary Identifier, RNTI, or a new, specific DCI format, which may be a compact format.

When using RNTI, for example, the UE is configured with a new RNTI, for example via an RRC signaling, and the new RNTI is associated with the HARQ entity/protocol to be used for a transmission so that during the blind decoding process, during which all RNTIs are tested, the UE may determine which HARQ protocol is to be applied.

The new DCI format may be used specifically for the delay critical transmissions, and since a synchronous HARQ does not require a HARQ process ID, the new DCI format may be provided which does not include a HARQ process ID. The DCI format, in case of URLLC services, may be referred to as a URLLC DCI format. A DCI format including the HARQ process ID because it relates to an asynchronous HARQ operation, e.g., for an eMBB service, may be referred to as a eMBB DCI format. In accordance with this approach, the UE may test to PDCCH candidates against its eMBB DCI formats and against the URLLC DCI format, so that the embedded checksum indicates which DCI format and, therefore, which HARQ entity/protocol, is to be applied. A DCI for signaling a DL transmission with synchronous HARQ may be referred to as a compact DCI Format 1_2 to be detected by blind decoding. The compact DCI Format 1_2 may include fields identical with DCI Format 1_0 and not include the following fields:

HARQ process number—4 bits
Downlink assignment index
PDSCH-to-HARQ_feedback timing indicator In accordance with yet further embodiments, dedicated PUCCHs may be used for each HARQ entity/protocol. For example, each HARQ/protocol may receive its dedicated PUCCH for transmitting the feedback or the LL-CSI in the uplink. This allows supporting the low latency for the URLLC HARQ protocol. Since the eMBB HARQ protocol may use bundling techniques, more processing and longer transmission times are needed, translating into a correspondingly longer PUCCH. This, however, is a bottleneck for URLLC HARQ procedures. Therefore, in accordance with embodiments, URLLC HARQ procedures uses a short PUCCH with a single ACK/NACK feedback and/or LL-CSI.

In accordance with yet further embodiments, RRC signaling may be used for configuring the number of HARQ processes and the UE capability. In NR and LTE, only a single HARQ protocol is used for the uplink and the downlink, respectively. Hence, configuring the number of HARQ processes for the PDSCH, the PUSCH and PSSCH is sufficient. In accordance with embodiments, the gNB may tell the UE how many HARQ processes are to be used for the synchronous HARQ protocol and the asynchronous HARQ protocol, see FIG. 7 above indicating at 314 and 316 the respective HARQ processes. The number of available HARQ processes for each protocol may be part of the UE capability which may be signaled to the gNB by the UE. Below an example for a signaling for the PDSCH is shown in which for the asynchronous HARQ operation, see nrof-HARQ-ProcessesForPDSCH, the number of HARQ processes for PDSCH is indicated, as well as the number of HARQ processes for PDSCH-URLLC, see nrofHARQ-ProcessesForPDSCH-URLLC.

```
PDSCH-ServingCellConfig ::= SEQUENCE {
codeBlockGroupTransmission SetupRelease {PDSCH-
   CodeBlockGroupTransmission} OPTIONAL xOverhead
   ENUMERATED { xOh6, xOh12, xOh18 } OPTIONAL
nrofHARQ-ProcessesForPDSCH ENUMERATED {n2, n4, n6, n10, n12,
n16}
   OPTIONAL
nrofHARQ-ProcessesForPDSCH-URLLC ENUMERATED {n2, n4, n6,
   n10, n12, n16} OPTIONAL
pucch-Cell ServCellIndex OPTIONAL , -- Cond SCellAddOnly ... }
```

In accordance with yet further embodiments, a DCI miss detection and rescheduling of retransmissions may be implemented. For example for downlink transmissions, the UE may miss an initial scheduling of the transmission, and in this case, naturally, also the following retransmissions are missed. The gNB may detect the missing PUCCH, namely the missing feedback or the missing LL-SCI, for example, dependent on the indicated PUSCH format. In case the gNB detects the miss of a DCI, the same transmission or the next redundancy version is rescheduled explicitly using a PDCCH at the next opportunity. The gNB, in case of a PUSH format 0-1 may perform a power thresholding so as to detect a missing PUCCH transmission, and in case of a PUCCH format 2-4, it may perform a checksum detection, wherein a mismatch in the embedded checksum indicates the missing of the initial grant.

In accordance with embodiments, a base station, gNB, may schedule a UL HARQ retransmission. For example an adaptive retransmission used, e.g., in NR, may be applied and the gNB may schedule an UL resource allocation for the retransmission using regular DCI formats on the PDCCH to indicate a new location and format. Thus, a full signaling of the HARQ control information is provided including, e.g., the process ID, the RV, the NDI.

Also an non adaptive and synchronous ARQ retransmission may be scheduled, and, in accordance with embodiments, the gNB has different options to trigger a retransmission by a UE.

In accordance with a first embodiment, a Physical Hybrid Indicator Channel, PHICH, may be used that is limited to ACK/NACKs, i.e., includes only the ACK/NACK messages. Once the UE received a NACK the UE retransmits with a fixed format on the same resource, optionally fixed to a predefined sequence of RVs. The signaling of a fast ACK is beneficial, e.g., to stop autonomous retransmissions and in URLLC scenarios retransmissions may be send without waiting for a NACK.

In accordance with a second embodiment, a PDCCH with a new Compact DCI format may be implemented so that only limited control information may be send, causing a reduced load when compared to a regular DCI format. For example, there may be no need to send the process ID because the same resources are used as for the initial transmission.

For example, for an initial transmission a regular DCI may be used with detailed information, and later, for the retransmissions or for an initial transmission of new data only the compact DCI format is used, e.g., when using a synchronous protocol.

Further, the gNB may request a new initial uplink transmission from the UE if no UL ACK/NACK on the first transmission is received, i.e., no ACK, or no NACK or nothing was received. Alternatively the gNB may request a specific redundancy version with compact DCI.

Figure 9:
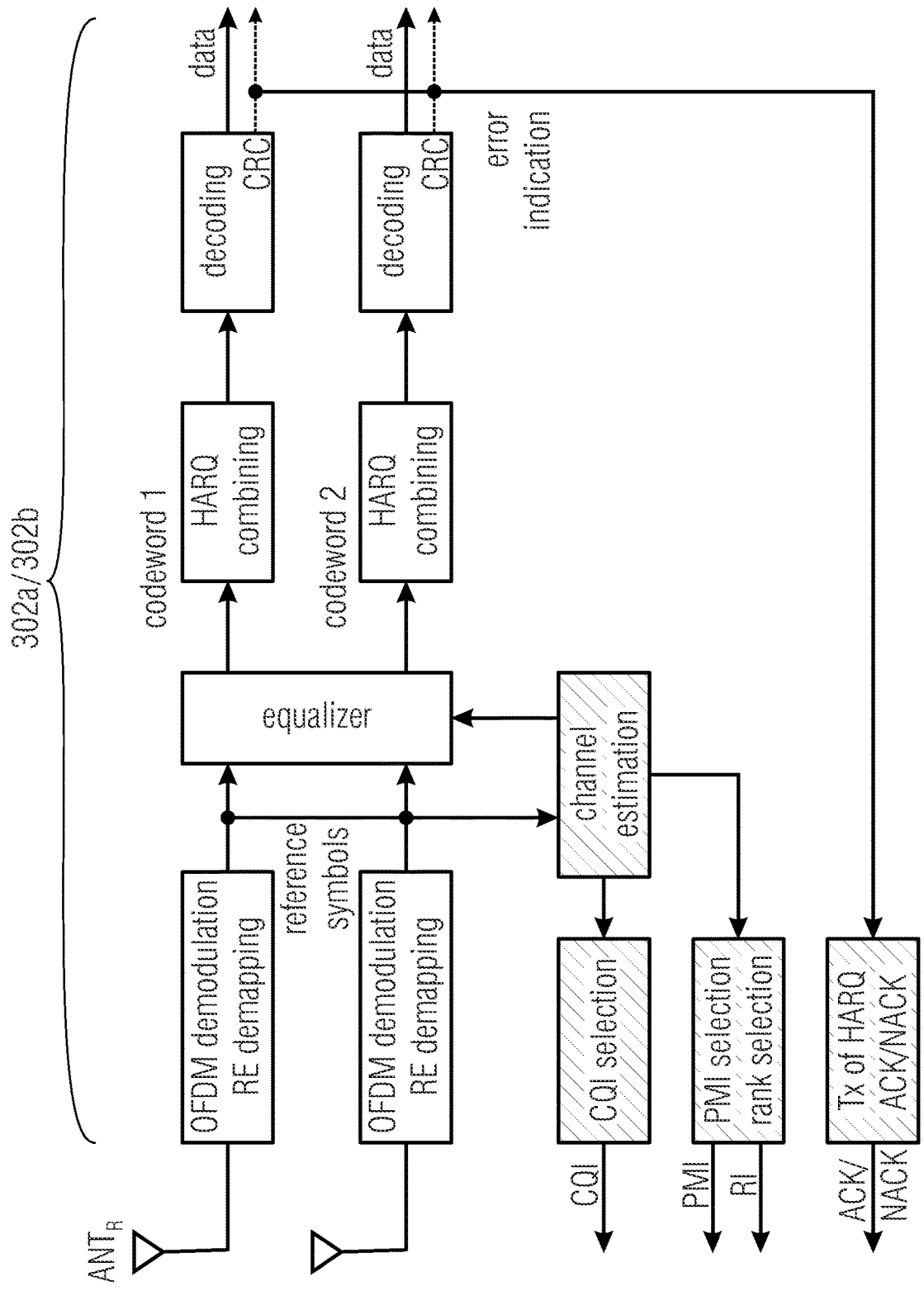
FIG. 9 illustrates details of a UE, like a UE as described above with reference to FIG. 11 including the antennas $ANT_R$, the signal processor $302a$ and the transceiver $302b$.

Further embodiments for a feedback, like UE feedback for a DL HARQ Retransmission, are now described. FIG. 9 illustrates details of a UE, like a UE as described above with reference to FIG. 11 including the antennas $ANT_R$, the signal processor 302a and the transceiver 302b. As is illustrated in FIG. 9 following the receipt of a transmission, initially, using the reference signals in the transmission, a channel estimation may be made so as to generate a CQI. Also further PMI and RI may be provided. The ACK/NACK message is created only once the data has been processed to see whether decoding is successful or not.

Embodiments may provide for a synchronous HARQ a low latency, LL, PUCCH that is send more frequently than a regular PUCCH, e.g., using a smaller transmission time interval. The LL-PUCCH may not support HARQ ACK/NACK bundling as this requires to wait for the receipt and decoding processing of a plurality of data packets. The LL-PUCCH enables the sending of HARQ ACK/NACKs immediately, they may even overtake HARQ ACK/NACKs of an asynchronous HARQ protocol as conventionally ACK/NACK have to be send in a FIFO, first in first out, sequence).

Asynchronous HARQ uses the regular PUCCH, and embodiments allow to multiplex the feedback into a regular PUSCH. If latency is not critical the multiplexing into the PUSCH is beneficial, e.g., a better link adaptation is possible, since PRBs are scheduled, a larger payload is provided, and the like.

Figure 10:
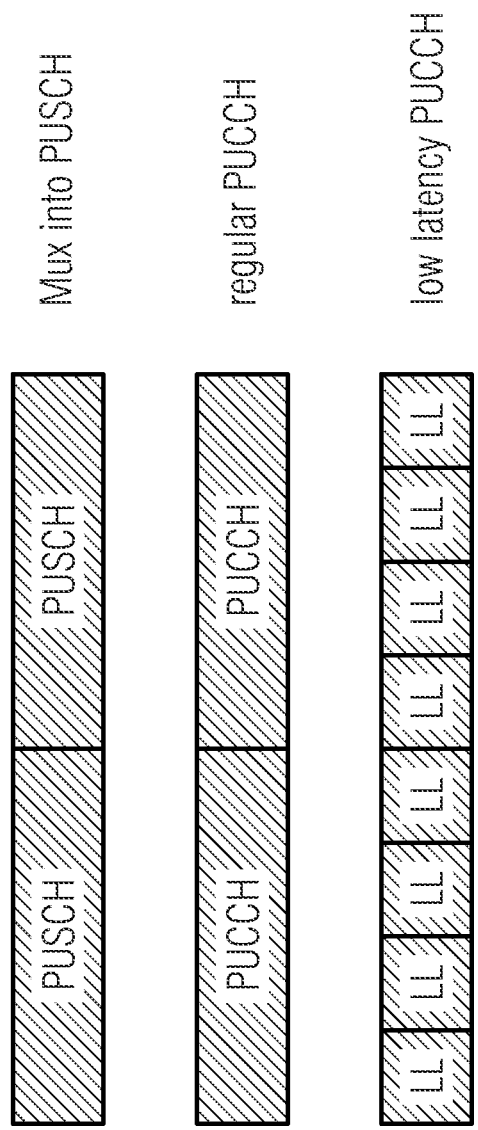
FIG. 10 illustrates the above concept of using for the feedback LL-PUCCHs in case of synchronous HARQ, and multiplexing the feedback into the regular PUCCH in case of asynchronous HARQ.

FIG. 10 illustrates the above concept of using for the feedback LL-PUCCHs in case of synchronous HARQ, and multiplexing the feedback into the regular PUCCH in case of asynchronous HARQ.

According to further embodiments, the LL-PUCCH may be employed for transmitting a low latency, LL, CSI, e.g., to support RV selection and adaptive retransmission in case for the initial transmission the channel situation, e.g. estimated by using DM-RS, was not ok, as well as a low latency, LL, HARQ, e.g., to provide faster ACK/NACK compared to slower eMBB decoding. For example, first, a LL-PUCCH is send with a fast CSI feedback based on frontloaded DM-RS of the initial transmission which is faster since it is based on a channel estimation and not on the decoding of the packet. If a fast CSI feedback is not received a new initial transmission may be send, e.g., in case the PDCCH resource allocation and therefore DM-RS are not received. The LL-CSI feedback may be interpreted or understood as an ACK for the PDCCH+DM-RS and/or the data itself. Following the LL-CSI feedback, a LL-PUCCH with the ACK/NACK may be send. The feedback may be combined with one or more additional or incremental CSI feedback, and may use the same or a different PUCCH format as the fast CSI feedback.

In accordance with embodiments, HARQ feedback can be enabled/disabled per HARQ process/entity. The idea unveiled can be explained based on the example shown in FIG. 11, while being applicable to all kinds of HARQ behavior.

Figure 11:
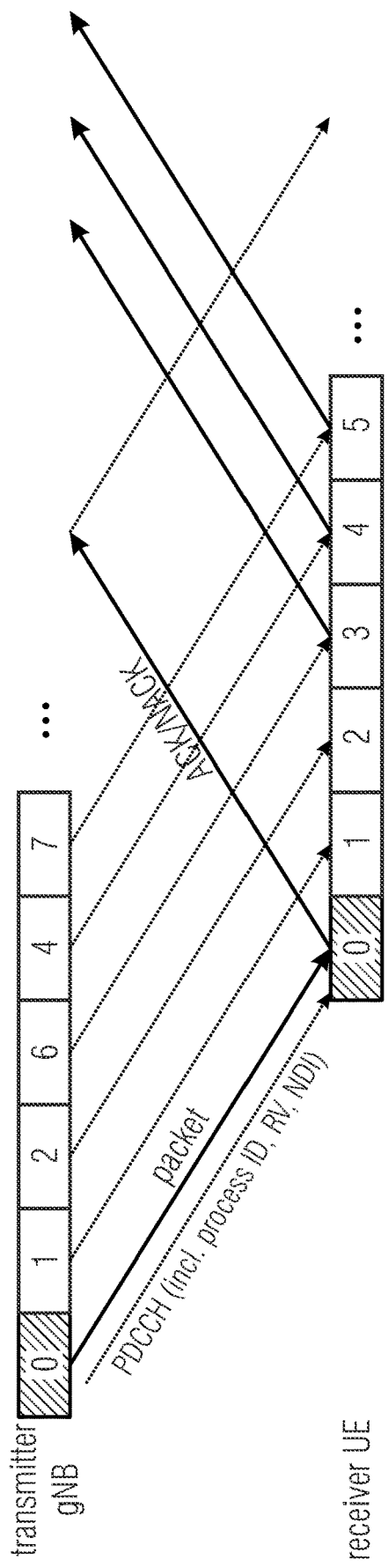
FIG. 11 illustrates an 8-channel Stop-and-Wait HARQ protocol according to which some of the HARQ processes are configured to not provide ACK/NACK feedback.

FIG. 11 illustrates an 8-channel Stop-and-Wait HARQ protocol according to which some of the HARQ processes are configured to not provide ACK/NACK feedback. As an example, in FIG. 11, HARQ Process ID #1 and #2 are configured not to provide ACK/NACK feedback. This configuration is sent from the gNB to the UE via the Radio Resource Protocol Layer (see FIG. 4) and the gNB also informs its lower layer.

In case of the downlink transmission, the gNB schedules via the PDCCH the resource allocation for every packet. This resource allocation also includes the HARQ process identity, the NDI and the RV ID. The UE receive has to read the PDCCH before it can decode the data on the PDSCH data channel. From the process identity it knows the HARQ process. Due to its RRC configuration it knows for the first packet on HARQ process identity #0, ACK/NACK have to be sent on the PUCCH. For the second packet on process identity #1, ACK/NACK should not be sent. The same of process identity #2 and so on.

The base station scheduling algorithm at MAC layer, can dynamically decide and multiplex which packets are put on which HARQ process. This decision can be based on different criteria e.g. depending on how much latency are acceptable for a packet (and whether a retransmission is possible) and what kind of reliability is required etc.

Figure 12:
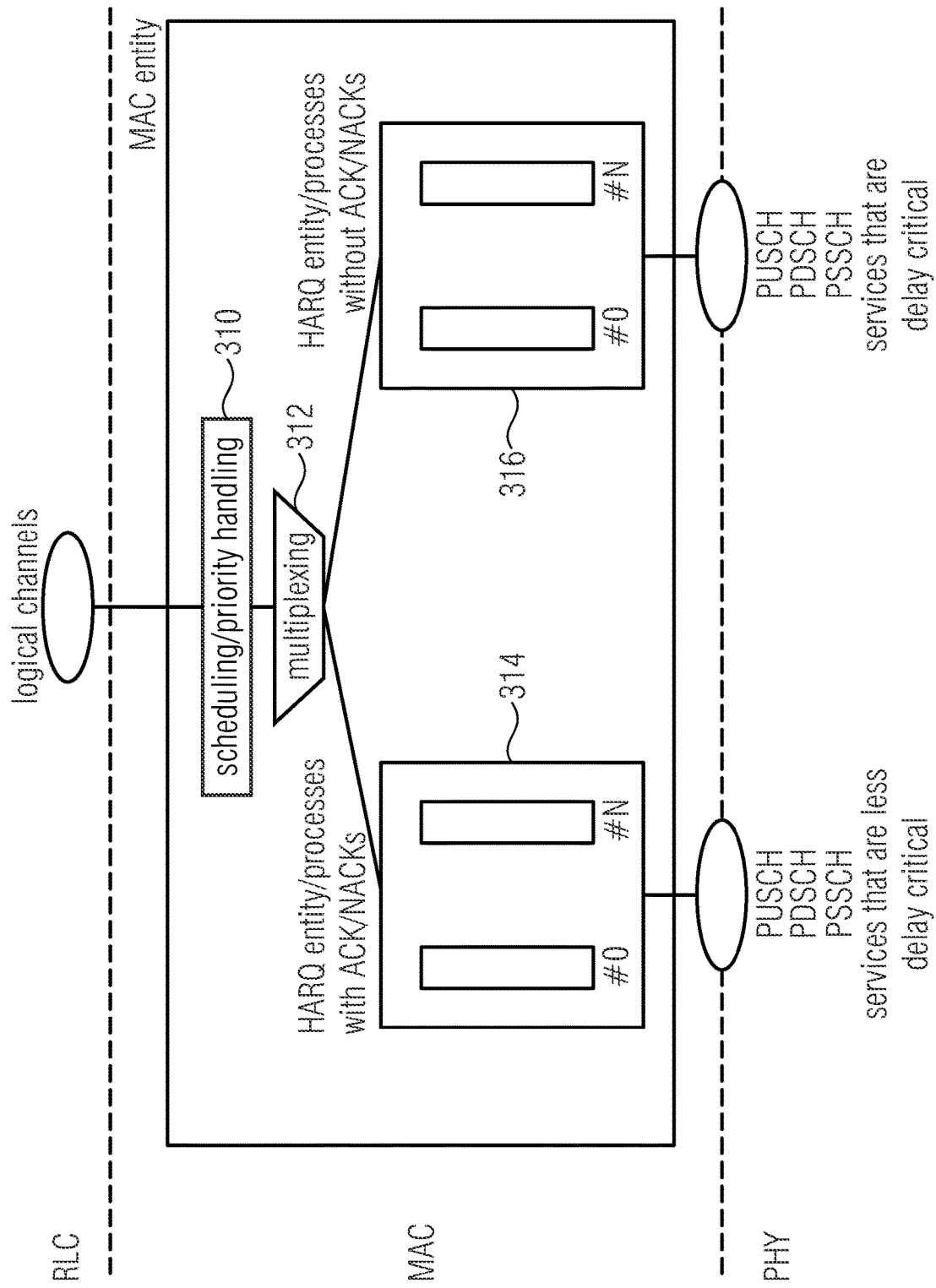
FIG. 12 illustrates an embodiment of a layer structure for implementing synchronous and asynchronous HARQ operation at the base station or the user equipment using a common MAC entity in the MAC layer.

FIG. 12 illustrates schematically the layer 2 structure for implementing simultaneous synchronous and asynchronous HARQ operation at the base station or the user equipment in accordance with an embodiment. At the MAC layer, a MAC entity is provided which performs the scheduling/priority handling 310 and the multiplexing 312. The MAC entity further includes a synchronous HARQ entity 314 for a synchronous HARQ operation and an asynchronous HARQ entity 316 for an asynchronous HARQ operation so that dependent on the HARQ to be used either one or both of the HARQ entities 314, 316 may be applied or used for a transmission of one or more data packets. In accordance with other embodiments, rather than providing a single MAC entity including the HARQ entities 314, 316, multiple MAC entities may be provided, each including a HARQ entity. Additionally, a single HARQ entity may also support a synchronous and asynchronous HARQ operation at the same time, shifting the HARQ processes between the HARQ operation modes dynamically or by re-/configuration, e.g., RRC signaling.

Note that FIG. 12 illustrates one example for different HARQ behavior to configure HARQ entities/processes with and without ACK/NACK feedback. Nevertheless, the same mechanisms are applicable to different HARQ aspects. HARQ entities/processes may for instance be configured with different number of retransmissions, different processing times, different buffer sizes etc.

For example, in embodiments, one HARQ entity/process may use a stop-and-wait protocol, while the other HARQ entity/process is using a window based ARQ protocol.

For example, in embodiments, one HARQ entity/process may use a synchronous protocol, where the other HARQ entity/process may use an asynchronous protocol.

For example, in embodiments, one HARQ entity/process may use chase combining, where the other HARQ entity/process may use incremental redundancy.

For example, in embodiments, one HARQ entity/process may send HARQ ACK/NACKs feedback, where the other HARQ entity/process does not send such feedback.

For example, in embodiments, HARQ entities/processes can be configured with different number of retransmissions, different processing times, different buffer sizes, etc.

In accordance with embodiments, MAC Multiplexing is supported. The MAC layer supports multiplexing different Logical Channels into one MAC PDU that is within one transmission time interval mapped onto a specific data channel (PDSCH, PUSCH or PSSCH), as indicated by way of example in FIG. 13.

Figure 13:
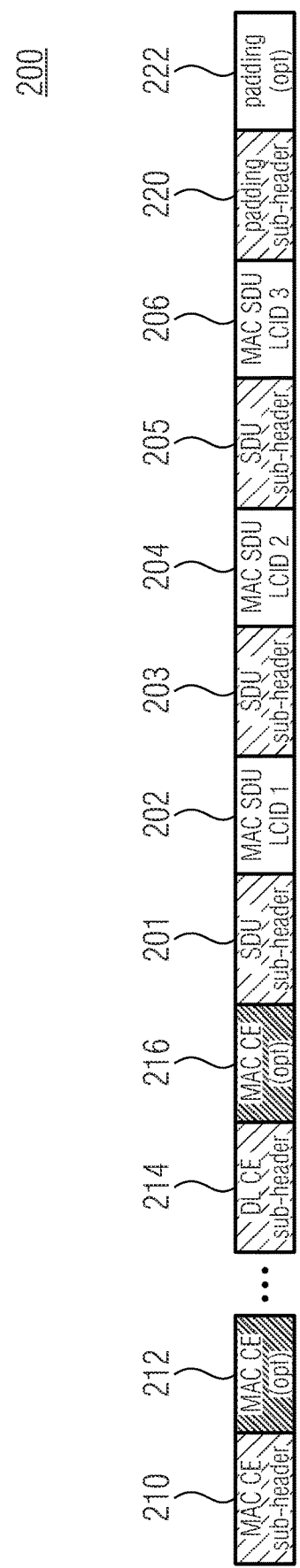
FIG. 13 shows a schematic representation of a MAC PDU comprising a plurality of MAC PSUs.

In detail, FIG. 13 shows a schematic representation of a MAC PDU 200, in accordance with an embodiment. As indicated in FIG. 13, each MAC SDU 202, 204, 206 of each Logical Channel is identified by a Logical Channel Identity (LCID) in a MAC Sub-header 201, 203, 205 proceeding the respective MAC SDU. At the beginning of the MAC PDU 200, MAC Control Elements 210, 212, 214, 216 can be included optionally. At the end padding 220, 222 might optionally take place to adapt the length of the MAC PDU 200 to the transport block size provided by the physical layer and selected by the MAC Scheduler. The example shown in FIG. 13 illustrates the transmission of several MAC CEs and the multiplexing of three logical channels and padding at the end of the MAC PDU.

One example for an uplink MAC Control Element is a Buffer Status Report (BSR) that is described in more detail below.

All scheduling decisions are made by the base station. This is a complex task particularly for the uplink. Before the scheduling decision the gNB has to know the buffer status and related QoS requirements from all the UEs and also has to know the characteristics of the mobile channel for the link adaptation. The principles procedure of uplink scheduling and link adaptation is illustrated in FIG. 14.

Figure 14:
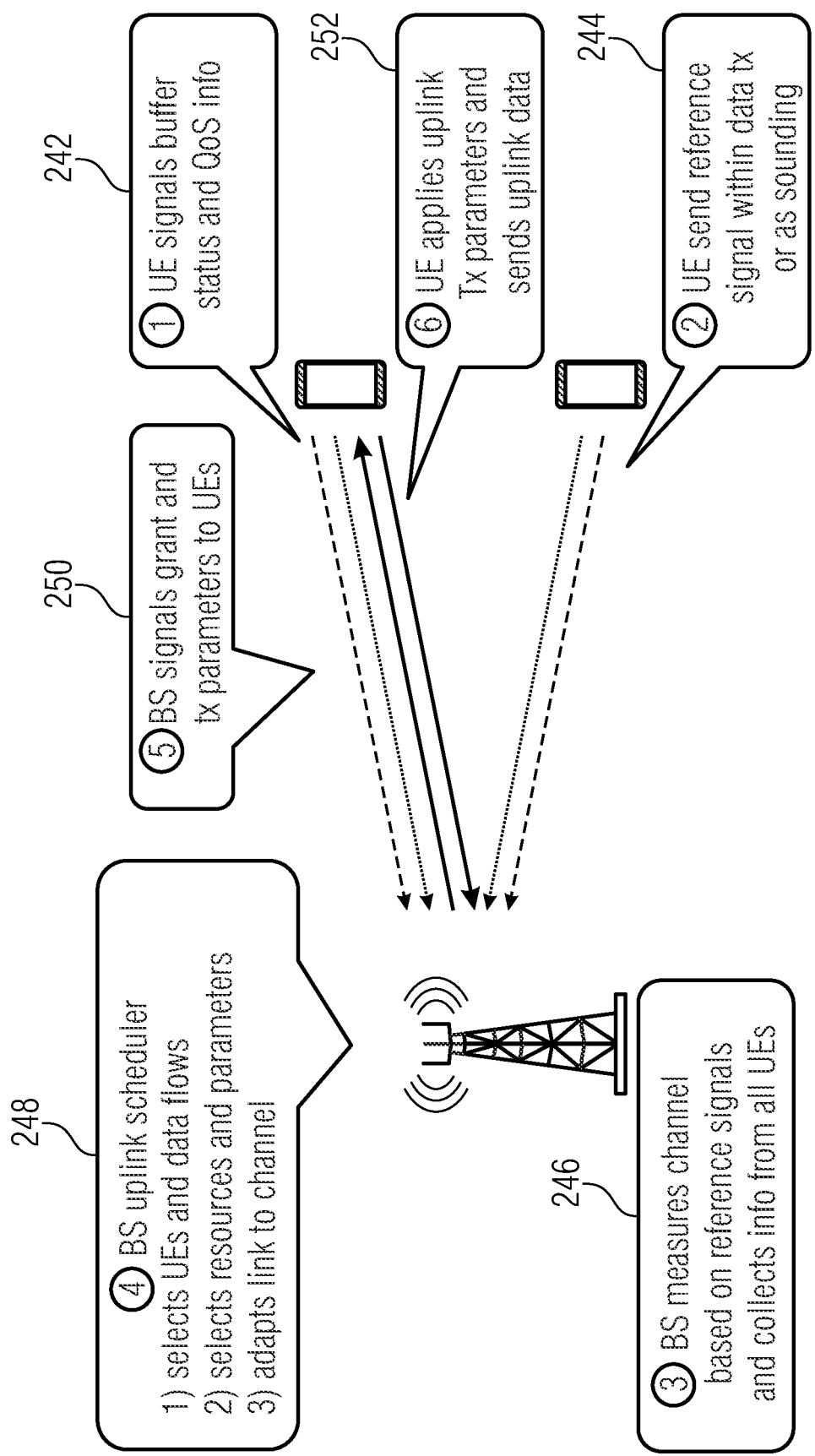
FIG. 14 shows a schematic representation of uplink scheduling and link adaptation between a BS and a UE in a wireless communication system.

In detail, FIG. 14 shows a schematic representation of uplink scheduling and link adaptation between a BS, base station, and a UE, user equipment, in a wireless communication system. As indicated in FIG. 14, in a first step 242, the UE may signal its buffer status and QoS information to the BS. In a second step 244, the UE may send a reference signal within data transmission, tx, or as sounding. In a third step 246, the BS may measure the channel based on reference signals and collect information from all UEs. In a fourth step, the BS may perform uplink scheduling, including 1) selecting UEs and data flow, 2) selecting resources and parameters, and 3) adapting link to channel. In a fifth step 250, the BS may signal grant and tx parameters to UEs. In a sixth step 252, the UE may apply uplink Tx parameters and send uplink data.

Thus, after the UE has requested resource for uplink transmission via a Buffer Status Report (BSR) in a MAC Control Element and the base station eventually granted some resources on the PDCCH Control Channel containing the Downlink Control Information bits that include the HARQ side information, the UE can transmit data.

Embodiments described herein particularly relate to sixth step 252, where the UE will actually send data in the uplink. So far it is largely up to the UE implementation, which data queues to serve and which MAC SDU to select to construct a MAC PDU.

Figure 15:
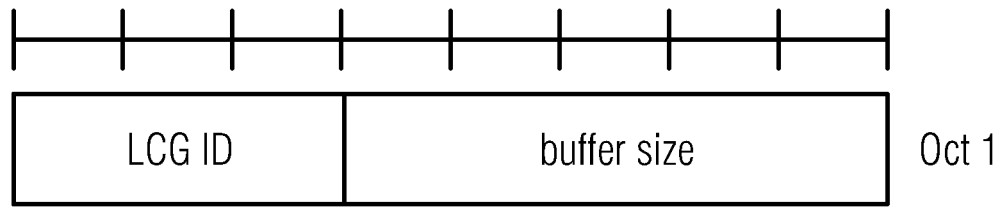
FIG. 15 shows a schematic representation of a short format of an LTE BSR.

Scheduling and Buffer Status reports are used by the UE to inform the gNB about it buffer status and to request resources for the uplink. A BSR is used by the UEs to request uplink resources from the gNB. The gNB will receive Scheduling Requests and BRS from all the UEs in the cell and the gNB scheduler will for every transmission time interval make the scheduling decisions. There are different formats. As an example, the short format of an LTE BSR consists of a Logical Channel Group Identity followed by some bits identifying the amount of data pending in the buffer, as shown in FIG. 15.

Figure 16:
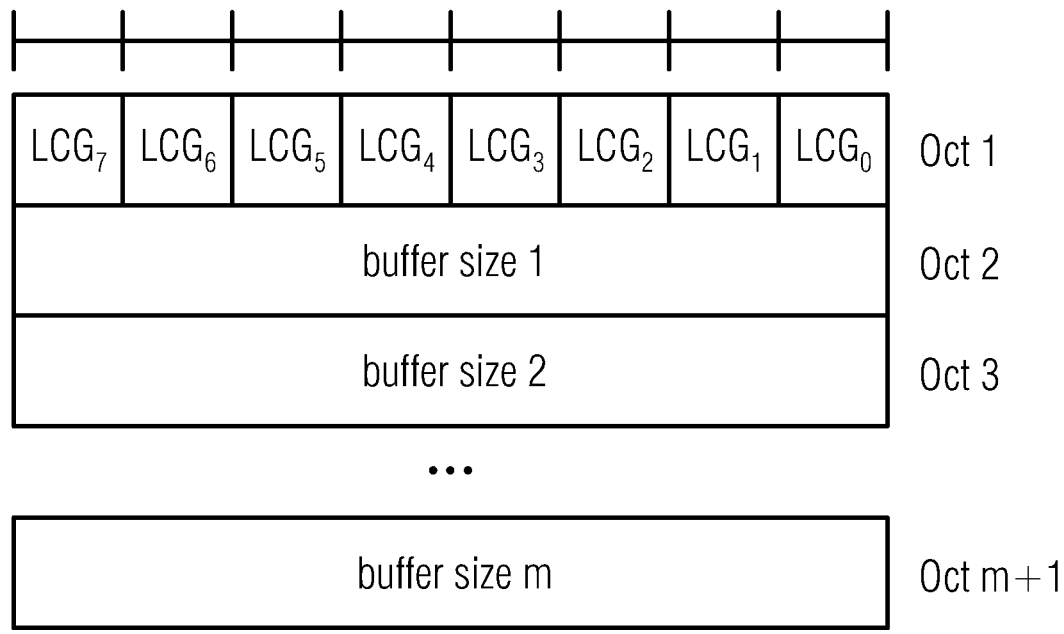
FIG. 16 shows a schematic representation of a long format of an LTE BSR.

In contrast to that, the long BRS format provides information for all four Logical Channel Groups according to the format shown in FIG. 16.

In a wireless communication system or network, like the one described above, the scheduler of the base station (e.g., gNB scheduler) schedules all uplink transmission. In detail, the scheduler decides almost everything related to HARQ while the UE executes what the base station decided. Within the PDCCH uplink grant send from the base station (e.g., gNB) to the UE, the base station tells the UE the HARQ process and the redundancy version that shall be used and if new data shall be send or not by the NDI. Nevertheless, for every uplink grant it is up to the UE to select the Logical Channel (LC) that should be served by this grant. The UE can also multiplex packets from different radio bearer in one MAC SDU.

In the past the multiplexing of different packets from different Logical Channels and Bearers was not as critical because in any case the same HARQ behavior was applied. With different HARQ configurations the data treatment of the packets will be very different, resulting in different resource usage, different packet treatment etc. Ideally the base station fully controls the UE behavior, e.g. tells the UE which logical channel and bearer should be served for each grant. In practice this will cause too much signaling overhead.

Figure 1A:
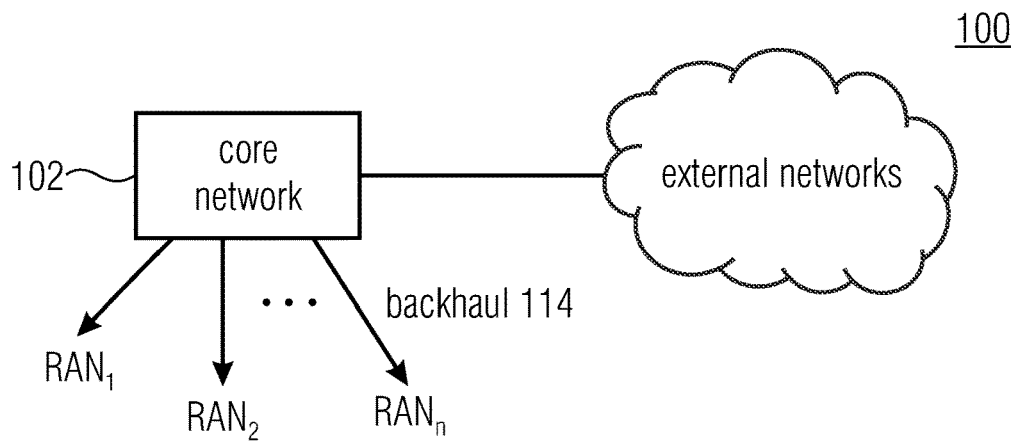
FIGS. 1A and 1B show a schematic representation of an example of a wireless communication system.
Figure 1B:
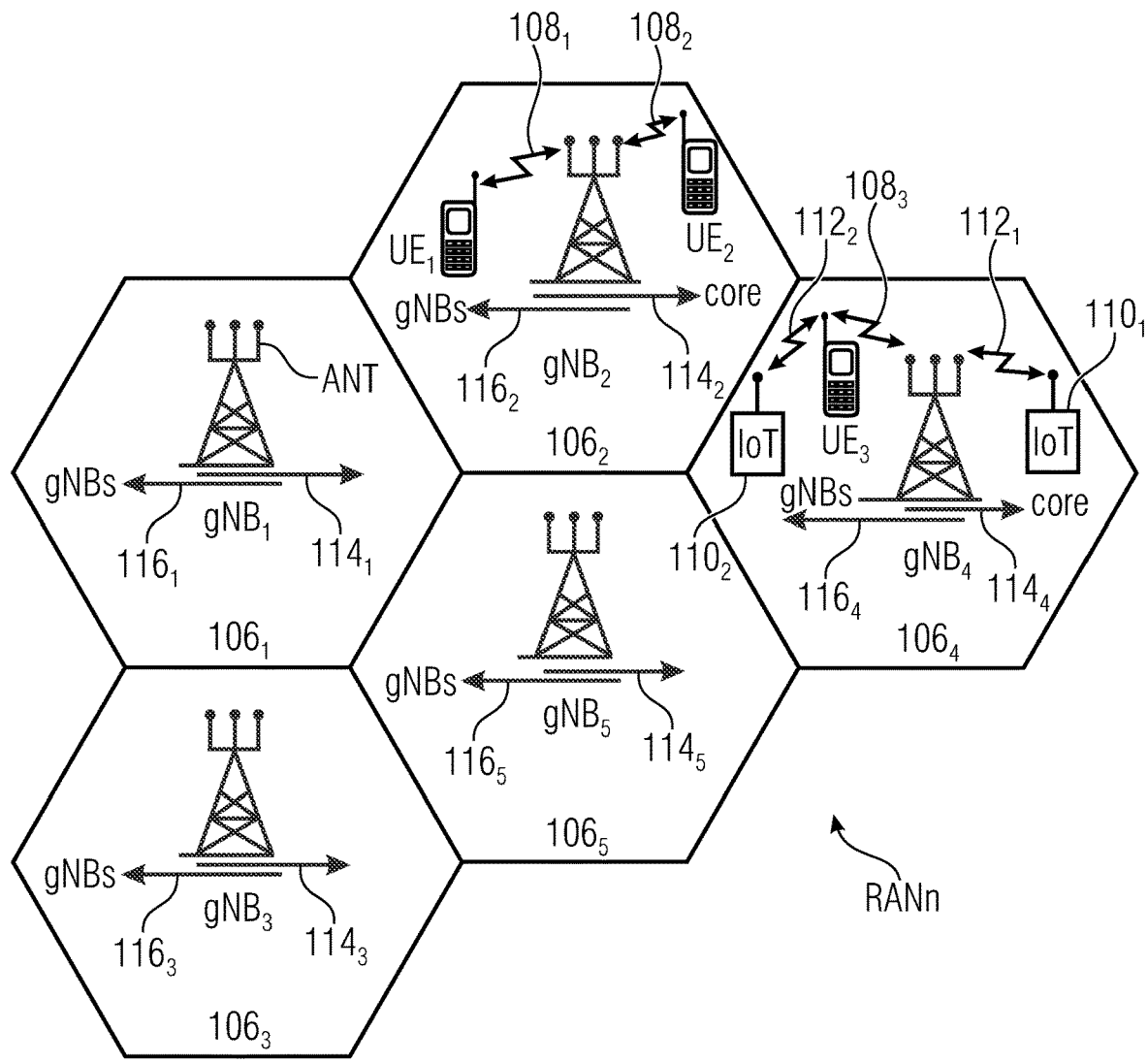
Figure 2:
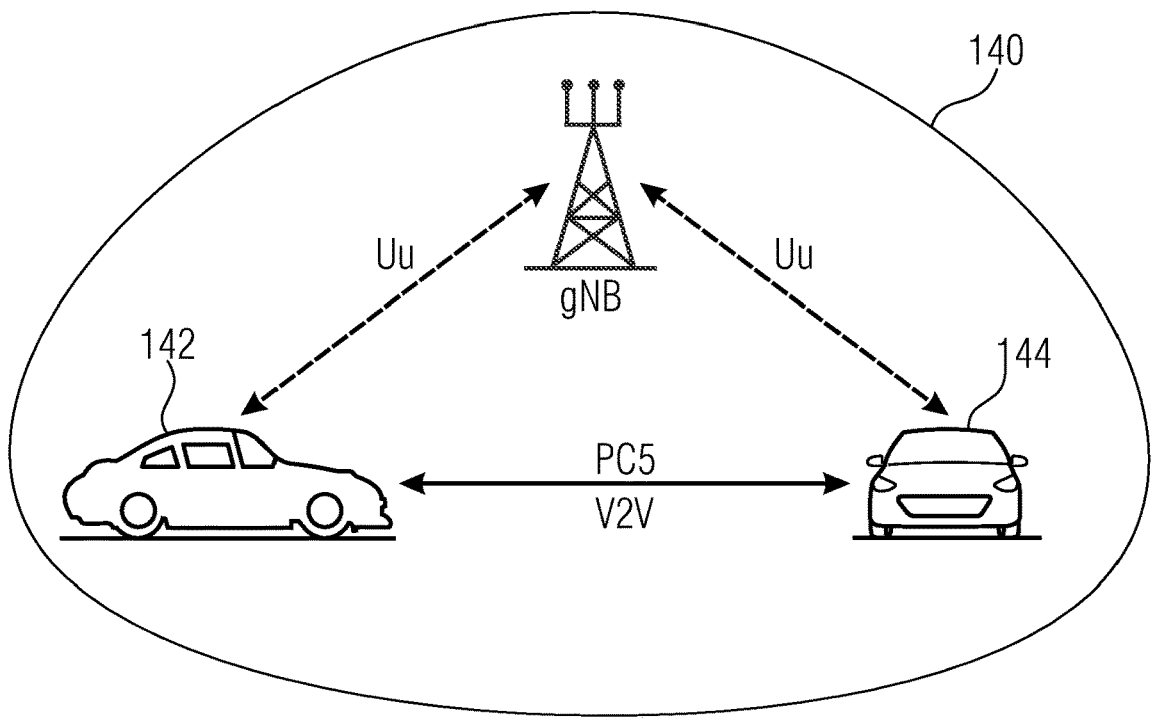
FIG. 2 shows a schematic representation of a situation in which UEs directly communicating with each other are in coverage of a base station.
Figure 3:
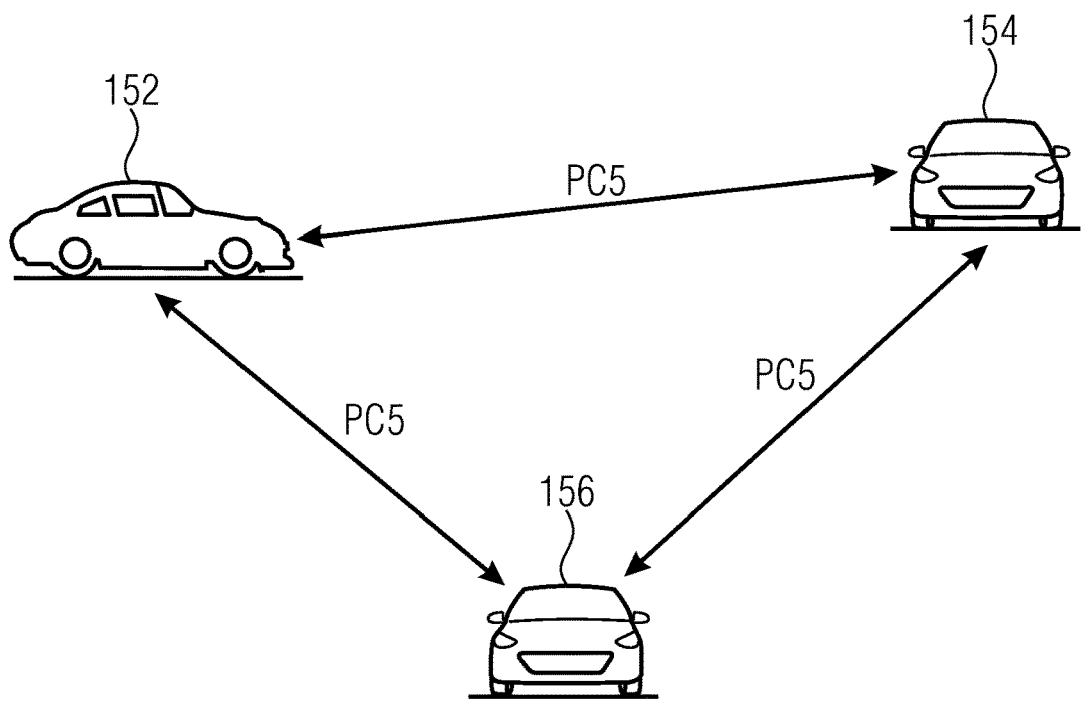
FIG. 3 shows a scenario in which UEs directly communicating with each other are not are not in coverage of a base station, i.e., are not connected to a base station.
Figure 17:
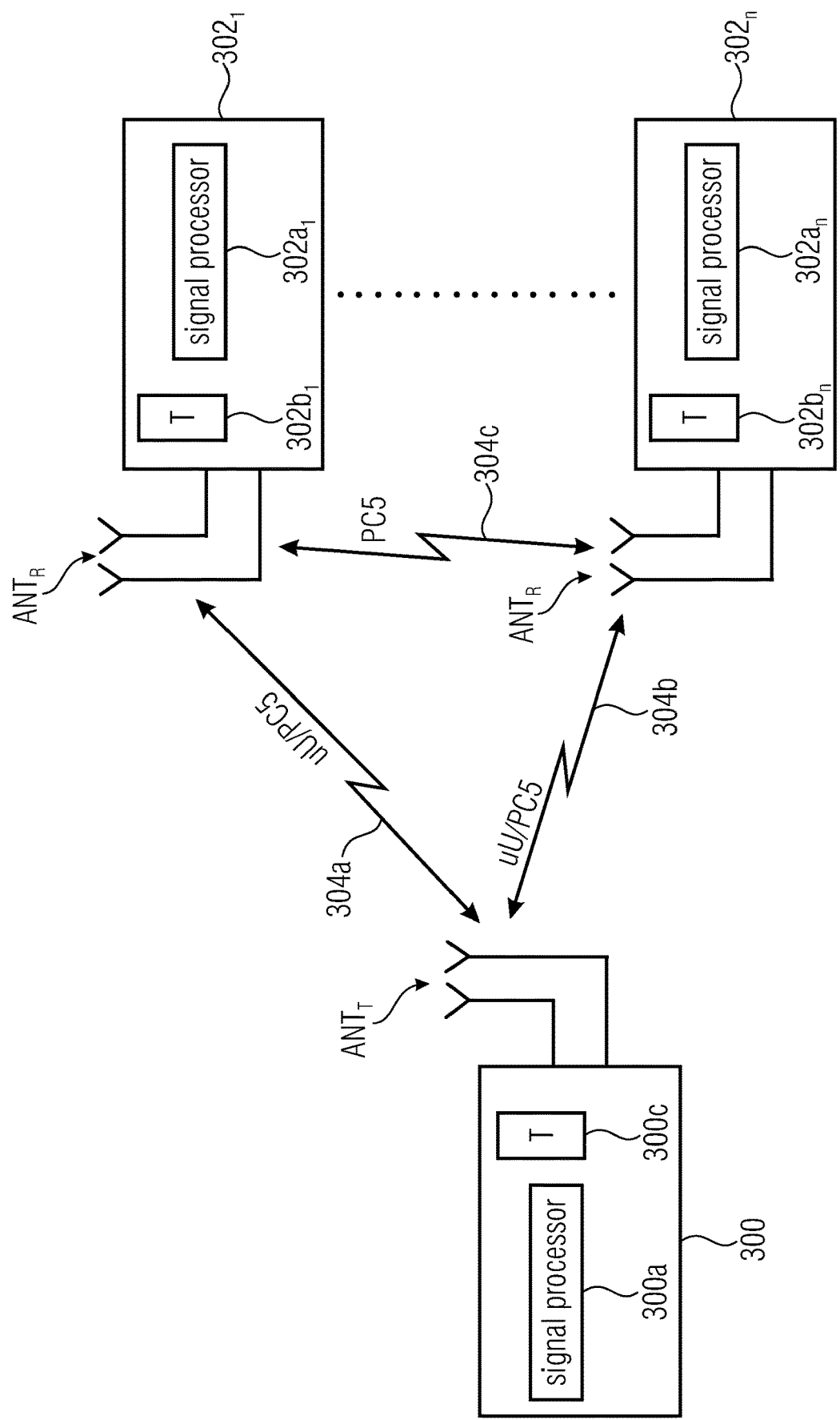
FIG. 17 is a schematic representation of a wireless communication system for communicating information between a transmitter and one or more receivers in accordance with embodiments of the present invention.

The present invention provides improvements and enhancements in a wireless communication system or network addressing the above described problems with the uplink multiplexing. More specifically, embodiments of the present invention avoid the signaling overhead tells the UE which logical channel and bearer should be served for each grant. Embodiments of the present invention may be implemented in a wireless communication system as depicted in FIGS. 1A and 1B including base stations and users, like mobile terminals or IoT devices. FIG. 17 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIGS. 1A and 1B, the one or more UEs 302, 304 and the base stations 300 may operate in accordance with the inventive teachings described herein.

Apparatus Transmitting Data, Like a UE or BS Supporting a Plurality of HARQ Processes Embodiments provide an apparatus, wherein the apparatus comprises
  a plurality of Hybrid ARQ, HARQ, entities, each of the plurality of HARQ entities configured to operate a HARQ process associated with one of a plurality of HARQ behaviors, the plurality of HARQ behaviors being different, and/or
  a Hybrid ARQ, HARQ, entity configured to operate a plurality of HARQ processes, each HARQ processes associated with one of a plurality of HARQ behaviors, the plurality of HARQ behaviors being different,
wherein the apparatus is configured to receive a control information [e.g. PDCCH uplink grant or PSCCH grant] from a transceiver in a wireless communication system, the control information transmitted over a radio channel [e.g., PDCCH, PSCCH] of the wireless communication system, the control information comprising a Hybrid ARQ, HARQ, identifier [e.g., HARQ process number] identifying one HARQ behavior out of the plurality of HARQ behaviors or one HARQ process out of the plurality of HARQ processes, the one HARQ process associated with a HARQ behavior.

Apparatus Receiving Data, Like a UE or BS Supporting a Plurality of HARQ Processes Embodiments provide an apparatus, wherein the apparatus comprises
  a plurality of Hybrid ARQ, HARQ, entities, each of the plurality of HARQ entities configured to operate a HARQ process associated with one of a plurality of HARQ behaviors, the plurality of HARQ behaviors being different, or
  a Hybrid ARQ, HARQ, entity configured to operate a plurality of HARQ processes associated with one of a plurality of HARQ behaviors, the plurality of HARQ behaviors being different,
wherein the apparatus is configured to transmit a control information [e.g. PDCCH uplink grant or PSCCH grant] to a transceiver in a wireless communication system, the control information transmitted over a radio channel [e.g., PDCCH, PSCCH] of the wireless communication system, the control information comprising a Hybrid ARQ, HARQ, identifier [e.g., HARQ process number] identifying one HARQ behavior out of the plurality of HARQ behaviors or one HARQ process out of the plurality of HARQ processes, the one HARQ process associated with a HARQ behavior.

Preferred Embodiments of the Apparatus Transmitting Data and/or the Apparatus Receiving Data In embodiments, the apparatus comprises a plurality of different channels or elements, the plurality of different channels or elements linked to one or more HARQ processes and/or behaviors out of the plurality of HARQ processes and/or behaviors according to a channel or element configuration.

In embodiments, the plurality of different channels or elements include one or more of
  different logical channels, LCH,
  different logical channel groups, LCG,
  different radio link control, RLC, channels,
  different packet data convergence protocol, PDCP, channels,
  different radio bearers or different quality of service, QoS, flows.

In embodiments, the plurality of different channels or elements are linked one by one to the plurality of HARQ processes and/or behaviors, and/or wherein the plurality of different protocol stack channels or elements are linked groupwise to one of the pluralities of HARQ processes and/or behaviors.

In embodiments, data packets of channels or elements that are linked to the same HARQ processes and/or behavior are included in the same data [e.g., uplink] transmission [e.g., multiplexed into the same MAC physical data unit, PDU].

In embodiments, data packets of channels or elements are associated with priorities, wherein data packets of channels or elements that are linked to the same HARQ processes and/or behavior are included based on their priorities in the same data [e.g., uplink] transmission [e.g., multiplexed into the same MAC physical data unit, PDU].

In embodiments, the data packets of channels or elements that are linked to the same HARQ processes and/or behavior are multiplexed based on UE internal knowledge [e.g., service type, traffic characteristics, prioritized bit rate, PBR] into the same data [e.g., uplink] transmission [e.g., multiplexed into the same MAC physical data unit, PDU].

In embodiments, the channel or element or HARQ processes and/or behavior configuration is predefined, and/or wherein the protocol stack channel or element or HARQ processes and/or behavior configuration is signaled by one or more of a radio resource control, RRC, signaling,
a downlink control information, DCI,
a sidelink control information, SCI,
a system information block, SIB.

In embodiments, the apparatus is configured to determine at least a part of the protocol stack channel or element or HARQ processes and/or behavior configuration itself based on one or more of the following criteria:
priority of the traffic,
quality of service,
latency or delay budget,
buffer status,
transmission history,
configured thresholds.

In embodiments, in case that a higher priority data packet of a channel or element that is linked to a HARQ process and/or behavior that is not identified by the current HARQ identifier is available for transmission and the high priority data packet is associated with a higher priority than the data packet of the protocol stack channel or element that is linked to the HARQ process and/or behavior identified by the current HARQ identifier, the apparatus is configured to transmit the high priority data packet according to the identified HARQ process and/or behavior.

In embodiments, transmitting the high priority data packet comprises including a transmission request [e.g., buffer status report, BSR] for the high priority data packet in the transmission of the high priority data packet [e.g., as MAC control element in the MAC physical data unit, PDU].

In embodiments, in case that an uplink transmission grant is larger than required for the available data packets of the channel or element that is linked to the HARQ process and/or behavior identified by the current HARQ identifier, one or more data packets of a channel or element that is linked to a HARQ process and/or behavior that is not identified by the current HARQ identifier are included in the same data [e.g., uplink] transmission [e.g., multiplexed into the same MAC physical data unit, PDU].

In embodiments, the apparatus is configured to
transmit one or more data packets to the transceiver in the wireless communication system according to the identified HARQ process and/or behavior, the one or more data packets being one or more data packets of a channel or element that is linked to the identified HARQ process and/or behavior according to the channel or element configuration, and/or
retransmit a data packet according to the identified HARQ process and/or behavior, wherein retransmitting may include the apparatus to receive from the transmitter [e.g., base station] a request for a retransmission for a data packet in case of a non-successful transmission of the data packet, and/or
repeat a transmission of a data packet according to the identified HARQ process and/or behavior.

In embodiments, the retransmitted data packet is a copy of the transmitted data packet, and/or wherein the retransmitted data packet is a redundant version of the transmitted data packet.

In embodiments, the retransmitted data packet is retransmitted
on the same frequency resource [e.g., using the same hopping pattern] or a different frequency resource [e.g., using a different hopping pattern],
using a different bandwidth part or carrier or cell [e.g., depending if carrier aggregation or dual connectivity is configured].

In embodiments, a HARQ process and/or behavior comprises
one or more HARQ operations and/or
a configuration for the different HARQ operations.

In embodiments, the plurality of HARQ operations comprise one or more of
a Stop-and-Wait HARQ and/or ARQ protocol,
a window based HARQ and/or ARQ protocol,
a synchronous protocol, the synchronous protocol scheduling the one or more retransmissions and/or the one or more HARQ ACK/NACKs at pre-defined time instances after the initial transmission,
an asynchronous protocol, the asynchronous protocol scheduling the one or more retransmissions and/or the one or more HARQ ACK/NACKs dynamically in time,
a retransmission scheme causing a retransmission without feedback, e.g., a HARQ blind transmission scheme or a K-repetition scheme transmitting a data packet K times without waiting for feedback.

In embodiments, in case no new data arrived and an uplink resource allocation or configured grand opportunity is present, the apparatus is configured to determine based on locally available information regarding a data packet planned for transmission [e.g., buffer occupancy, timing information, such as transmission timer, or service requirements of the data packet] and/or configuration or parameters of the communication system [e.g. the propagation delay or round trip time (RTT)] whether the data packet is
transmitted,
discarded,
replaced by a different version of the data packet [e.g., using the same PHY parameters],
replaced by a different version of the data packet, the different version of the data packet transmitted according to a different transmission parameter [e.g., modulation scheme, MIMO scheme, or transmit power].

In embodiments, the apparatus is configured to transmit an uplink control information to the transceiver in the wireless communication system using a control channel or data channel, the uplink control information indicating the different transmission parameter [e.g. different coding modulation scheme, MIMO scheme, aggregation factor] and/or comprising an information about the different version of the data packet [e.g. redundancy version, new data indicator].

In embodiments, in case new data arrived and an uplink resource allocation or configured grant opportunity is present, the apparatus is configured to determine
a HARQ behavior and/or HARQ process for the transmission of the new data and to transmit a data packet with the new data according to the determined HARQ behavior and/or HARQ process, and or
a modulation and coding scheme, and or
a MIMO scheme, and or
an aggregation factor (AF).

In embodiments, the HARQ behavior and/or HARQ process and/or HARQ New Data Indicator and/or HARQ Redundancy Version identified by HARQ identifier of the downlink control information and the determined HARQ behavior and/or HARQ process and/or HARQ New Data Indicator and/or HARQ Redundancy Version are different; and/or wherein the modulation and/or coding scheme signaled by the transmitter [e.g., base station] of the wireless communication system [e.g., via downlink control information] are different than the determined modulation and/or coding scheme; and/or wherein the MIMO scheme signaled by the transmitter [e.g., base station] of the wireless communication system [e.g., via downlink control information] is different than the determined MIMO scheme; and/or wherein the aggregation factor [e.g., blind retransmissions] signaled by the transmitter [e.g., base station] of the wireless communication system [e.g., via downlink control information] is different than determined aggregation factor.

In embodiments, the apparatus is configured to transmit an uplink control information to the transceiver in the wireless communication system using a control channel or data channel, the uplink control information indicating
    the determined HARQ behavior and/or HARQ process and/or HARQ New Data Indicator and/or HARQ Redundancy Version; and/or
    the determined modulation and/or coding scheme; and/or
    the determined MIMO scheme; and/or
    the determined aggregation factor.

In embodiments, the apparatus is configured to determine
    the HARQ behavior and/or HARQ process and/or HARQ New Data Indicator and/or HARQ Redundancy Version for the transmission of the new data; and/or
    the modulation and/or coding scheme; and/or
    the MIMO scheme; and/or
    the aggregation factor, based on a defined algorithm or based on an information provided by the transceiver [e.g., base station] in the wireless communication system.

In embodiments, the wireless system comprises two or more user equipments, at least two of the user equipments communicating directly with each other [e.g., V2X, D2D] via a sidelink communication [e.g., PC5] while being in connected mode or idle mode or inactive mode, and the apparatus comprises a UE.

System

Embodiments provide a wireless communication network, comprising at least one of the inventive UEs and at least one of the inventive base stations.

In embodiments, the UE comprise one or more of
    a mobile terminal, or
    stationary terminal, or
    a vehicular terminal, or
    cellular IoT-UE, or
    an IoT device, or
    a ground based vehicle, or
    an aerial vehicle, or
    a drone, or
    a moving base station, or
    road side unit, or
    a building, or
    any other item or device provided with network connectivity enabling the item/device to communicate using the wireless communication network, e.g., a sensor or actuator.

In embodiments, the BS comprise one or more of
    a macro cell base station, or
    a micro cell base station, or
    a small cell base station, or
    a central unit of a base station, or
    a distributed unit of a base station, or
    a road side unit, or
    a UE, or
    a remote radio head, or
    an AMF, or
    an SMF, or
    a core network entity, or
    a network slice as in the NR or 5G core context, or
    any transmission/reception point (TRP) enabling an item or a device to communicate using the wireless communication network, the item or device being provided with network connectivity to communicate using the wireless communication network.

Further embodiments provide a wireless communication network, comprising at least two of the inventive UEs.

In embodiments, the UE comprise one or more of
    a mobile terminal, or
    stationary terminal, or
    a vehicular terminal, or
    cellular IoT-UE, or
    an IoT device, or
    a ground based vehicle, or
    an aerial vehicle, or
    a drone, or
    a moving base station, or
    road side unit, or
    a building, or
    any other item or device provided with network connectivity enabling the item/device to communicate using the wireless communication network, e.g., a sensor or actuator.

Methods

Embodiments provide a method comprising:
  providing
    a plurality of Hybrid ARQ, HARQ, entities, each of the plurality of HARQ entities operating a HARQ process associated with one of a plurality of HARQ behaviors, the plurality of HARQ behaviors being different, or
    a Hybrid ARQ, HARQ, entity performing a plurality of HARQ processes, each HARQ processes associated with one of a plurality of HARQ behaviors, the plurality of HARQ behaviors being different, and
  receiving a control information [e.g. PDCCH uplink grant or PSCCH grant] from a transceiver in a wireless communication system, the control information transmitted over a radio channel [e.g., PDCCH, PSCCH] of the wireless communication system, the control information comprising a Hybrid ARQ, HARQ, identifier [e.g., HARQ process number] identifying one HARQ behavior out of the plurality of HARQ behaviors or one HARQ process out of the plurality of HARQ processes, the one HARQ process associated with a HARQ behavior.

Further embodiments provide a method, comprising:
  providing
    a plurality of Hybrid ARQ, HARQ, entities, each of the plurality of HARQ entities operating a HARQ process associated with one of a plurality of HARQ behaviors, the plurality of HARQ behaviors being different, or
    a Hybrid ARQ, HARQ, entity operating a plurality of HARQ processes, each HARQ processes associated with one of a plurality of HARQ behaviors, the plurality of HARQ behaviors being different, and
  transmitting a control information [e.g. PDCCH uplink grant or PSCCH grant] from a transceiver in a wireless communication system, the control information transmitted over a radio channel [e.g., PDCCH, PSCCH] of the wireless communication system, the control information comprising a Hybrid ARQ, HARQ, identifier [e.g., HARQ process number] identifying one HARQ behavior out of the plurality of HARQ behaviors or one HARQ process out of the plurality of HARQ processes, the one HARQ processes associated with a HARQ behavior.

Computer Program Product

The present invention provides a computer program product comprising instructions which, when the program is executed by a computer, causes the computer to carry out one or more methods in accordance with the present invention.

Thus, embodiments provide different methods of how a UE behavior can be controlled. For every option there are two possibilities, either it is defined in the specification, what the UE has to do (pre-configured), or the behavior is configurable by the base station (e.g., gNB). The base station (e.g., gNB) configuration can be provided via RRC signaling, via broadcast, via UE specific signaling semi-statically, or via PDCCH DCI dynamically. Via broadcast signaling, the configuration can be send via an existing or a new System Information Block (SIB). It may either be valid for all UEs in the cell or all UEs using a specific functionality, such as Non-Terrestrial Networks (NTN) or extreme long coverage that have to read and apply this specific System Information Block. The semi-static UE specific signaling can be provided via an RRC message send to the UE, usually the RRC Reconfiguration Message. Once the RRC Reconfiguration Message is processed by the UE, the new settings will be applied with or without a specific delay. Alternatively, the configuration may be provided in the Downlink Control Information, DCI, on a per transmission basis. Hence, in the last case, the behavior of a HARQ process may change up to indication in the DCI.

In an embodiment, Logical Channels can be linked to HARQ entities and/or processes in the respective configuration of this Logical Channel. That means, if a grant is received on the PDCCH, the UE reads the Downlink Control Information (DCI) of the PDCCH and recognizes the HARQ process identity. Based on the Logical Channel configuration (mapping between LCHs and HARQ processes and/or entities) the UE knows which Logical Channels can be served with this grant. There can be a 1:1 mapping of LCHs to HARQ entities/processes or an N:1 mapping of multiple LCHs to a HARQ entity/process. In case of an N:1 mapping, the UE is allowed to multiplex packets of all LCHs that have been mapped to this HARQ entity/process into one MAC SDU. As usual, the LCH can be identified by the LCID in the MAC-sub-header.

In a preferred embodiment, the data packets of the different LCHs, logical channels, can be associated with priority values configured by the network. For instance, the base station (e.g., gNB) might configure a priority {1 . . . 16} on a per LCH basis. Depending on the resource assignment, multiple MAC SDUs might be send within one MAC PDU. The UE can select MAC SDUs from the buffer queues according to the priority value, whereas a low priority number means a high priority and a large priority value means a low priority. This behavior might be standardized or might be left to implementation. Since the UE might have some information available that is not known to the network, an implementation specific behavior might be preferred. Such UE internal knowledge might be information about the service type and traffic characteristics. This prioritized scheduling might be extended with the concept of Prioritized Bit Rate (PRB). The PRBs, also configured, for example, per LCH, of each configured LCH might first be served before the absolute priority is used to serve one LCH priority after the other. This concept can be used to avoid starvation of certain services by providing a minimum bit rate.

There are many LCHs and this configuration might cause already quite some overhead. One way to reduce this overhead is to group the LCH, logical channels, into Logical Channel Groups (LCG). LCGs are also used in the Buffer Status Reports send from the UE to the base station (e.g., gNB) to request resources. In LTE there are 4 LCGs and in NR there are 8 LCGs.

According to a preferred embodiment, Logical Channel Groups or Logical Channels can be linked to HARQ entities/processes depending on their HARQ behavior (report or not) (Note that in case of RRC configured behavior, LCGs can be mapped to HARQ processes, wherein in case of dynamic indication in DCI, LCGs can be mapped to HARQ behaviors). Once again the base station (e.g., gNB) might signal this mapping to the UE via the RRC reconfiguration or it might be hardcoded by the standard. In case an uplink packet needs to be transmitted, the UE might send a Buffer Status Report in the uplink, for example, via a MAC Control Element. The BSR indicates the amount of data that is pending per Logical Channel Group identified by the LCG ID. The base station (e.g., gNB) will make its scheduling decision and might now schedule the UE. Once the grant in PDCCH is received, identifying the HARQ process identity, the UE knows which Logical Channels of which Logical Channel Group to serve. In some embodiments, the UE is only allowed to multiplex data (e.g. RLC SDUs) of Logical Channels within the Logical Channel Group, but not outside of the Logical Channel Group.

In an alternative embodiment, one or more or all Signaling Radio Bearers can be linked to one set of HARQ entities/processes, while one or more or all Data Radio Bearers can be linked to another set of HARQ entities/processes depending on the HARQ behavior (report or not). Besides a mapping of LCH, LCG, SRBs, DRBs to HARQ entities and processes, the same principles can be applied to map RLC Channels and/or QoS Flow to HARQ entities and processes. The concept of prioritized scheduling and PRB rates might be applied to each of the mapping variants.

In a further embodiment, the UE itself can decide to map certain Logical Channels/Logical Channel Groups/Signal Radio Bearers/Data Radio Bearers to certain HARQ processes or HARQ behaviors based on one or more criteria:
  priority of the traffic, e.g., high priority traffic is only transmitted with HARQ,
  Quality of Service, e.g., it can be determined whether a HARQ-less transmission satisfies QoS requirements and, if not, only grants associated with HARQ might be used,
  delay budget, e.g., it can be determined whether there is enough delay budget for performing retransmissions, and if not, a HARQ-less transmission (grant associated with HARQ-less operation) might be used,
  buffer status,
  transmission history,
  configured thresholds, such as receive signal strength/quality measurements RSRP, RSRQ, SINR.

RRC Configuration Examples Based on NR Rel. 15 TS38.331

According to an example, an uplink LCH, logical channel is associated to a HARQ process based on the following listing.

```
-- ASN1START
-- TAG-LOGICALCHANNELCONFIG-START
LogicalChannelConfig ::=         SEQUENCE {
    ul-SpecificParameters             SEQUENCE {
        priority                      INTEGER (1..16),
        prioritisedBitRate            ENUMERATED {kBps0, kBps8,
kBps16, kBps32, kBps64, kBps128, kBps256, kBps512,
                                      kBps1024, kBps2048,
kBps4096, kBps8192, kBps16384, kBps32768, kBps65536, infinity},
        bucketSizeDuration            ENUMERATED {ms5, ms10,
ms20, ms50, ms100, ms150, ms300, ms500, ms1000,
spare7, spare6, spare5, spare4, spare3,spare2, spare1},
        allowedServingCells                        SEQUENCE (SIZE
(1..maxNrofServingCells-1)) OF ServCellIndex
OPTIONAL,   -- PDCP-CADuplication
        allowedSCS-List                            SEQUENCE (SIZE
(1..maxSCSs)) OF SubcarrierSpacing       OPTIONAL,   -- Need R
        maxPUSCH-Duration             ENUMERATED {ms0p02,
ms0p04, ms0p0625, ms0p125, ms0p25, ms0p5, spare2, spare1}
                                                   OPTIONAL,   --
Need R
        configuredGrantType1Allowed           ENUMERATED {true}
OPTIONAL,   -- Need R
        logicalChannelGroup                   INTEGER (0..maxLCG-
ID)                                      OPTIONAL,   -- Need R
        schedulingRequestID                   SchedulingRequestId
OPTIONAL,   -- Need R
        logicalChannelSR-Mask                 BOOLEAN,
        logicalChannelSR-DelayTimerApplied    BOOLEAN,
        ...,
        bitRateQueryProhibitTimer             ENUMERATED { s0, s0dot4,
s0dot8, s1dot6, s3, s6, s12,s30}         OPTIONAL  -- Need R
    }
OPTIONAL,   -- Cond UL
    ...
}
```

In this uplink LCH Configuration Information Element the following additional parameters can be added HARQ-process-bitmap BIT STRING (SIZE(16))

that associates the LCH to the HARQ processes and/or entities. The UE might now recognize from the HARQ process identity that is scheduled for uplink transmission on the downlink PDCCH, which LCH should be served in the uplink.

In a preferred embodiment, the HARQ processes are itself linked to the Logical Channel Groups. Different realizations could be foreseen, such as pre-configuring the different HARQ entities or pre-configuring different Logical Channel Group with different HARQ behavior e.g. on/off switching or dynamic feedback indication via PDCCH DCI, e.g., based on the following listing.

```
HARQEntityConfig ::=         SEQUENCE {
    HARQ-process-bitmap      BIT STRING (SIZE(16))
    HARQ-process-feedback    ENUMERATED {on,
dynamic, off)
    logicalChannelGroup      INTEGER (0..maxLCG-
ID)
}
LogicalChannelGroupConfig ::=   SEQUENCE {
    HARQ-process-bitmap      BIT STRING (SIZE(16))
    HARQ-process-feedback    ENUMERATED {on, off}
}
```

Depending on the number of HARQ processes, the bitmap approach might be suitable or not. Alternatively, HARQ processes can be assigned in sequence. In this case just a number might be defined (e.g., 4), wherein the HARQ process identities might be derived implicitly (e.g. 5, 6, 7, 8).

Logical Channel Prioritization Mapping Restrictions

By default, the UE should not segment RLC SDUs but map a RLC SDU into a MAC PDU as a whole if it fits into the granted resources.

For the multiplexing and MAC PDU assembly, a Logical Channel Prioritization rule can be defined for the UE. Once again, this might be partly specified, partly configured by RRC and partly be proprietarily implemented in the UE.

The RRC can control the scheduling of uplink data by signaling a configuration for each logical channel per MAC entity. The eNB RRC signaling can signal as part of the LCH configuration (see above listing) a Priority, a Prioritized Bit Rate (PBR) and a Bucket Size Duration (BSD) (see ASN1 figured from the LCH configuration). The MAC PDU can be constructed first considering the Prioritized Bit Rate priority and next the Priority value in decreasing order. Thereby, a low priority value may represent a high priority order. The PBR can be calculated, for example, using a token bucket model.

As discussed above, a LCH may not be allowed to be multiplexed on all HARQ processes or on HARQ processes using a certain behavior or certain feedback type. In this case, the multiplexing and MAC PDU assembly might be restricted by RRC configuration. This restriction can be realized by signaling the allowed multiplexing options such as:

AllowedHARQ-process-feedback ENUMERATED {on, dynamic, off}
AllowedHARQ-process-bitmap BIT STRING (SIZE(16))
AllowedHARQ-process-behaviour-type ENUMERATED {regular, aggregation, single tx}

Alternatively, also the not allowed multiplexing options could be signaled. In any case, when the UE receives an Uplink Grant via a PDCCH resource allocation, the UE has to follow the configured Logical Channel Priority Mapping Restrictions as configured by the base station (e.g., gNB), when assembling the MAC PDU for transmission. This means that the UE should only select logical channels for each uplink grant with the HARQ process identity that might be signaled that satisfies the configured conditions for HARQ process/entity usage. Otherwise, once again, the Logical Channel Prioritization follows the absolute priorities also considering the Prioritized Bite Rate with the token bucket model.

In accordance with embodiments, MAC Control Elements and RRC Messages can be multiplexed. Depending on the HARQ behavior, the delivery time of the message and also the reliability will vary. This may impact the delivery of the MAC Control Elements (and/or RRC Messages) that are mapped into the MAC PDUs as well. There might be some restrictions being configured per Logical Channel or per MAC entity if MAC CEs (and/or RRC Messages) are allowed to be multiplexed into a MAC PDU or not. Furthermore, depending on the priority of the MAC CEs (and/or RRC Messages), some MAC CEs (and/or RRC Messages) might be send multiple times over different HARQ processes/entities while other MAC CEs (and/or RRC Messages) are forbidden to be send multiple times. In case there is a prohibit timer defined (limiting periodicity how often an element is allowed to be send), a timer may be defined to run on a per HARQ process/entity basis or over all HARQ processes/entities.

High Priority Data Arrival for Uplink while Low Priority Data was Scheduled Already One of the key principles is that the UE requests uplink resources based on a BSR reporting, e.g., BSR on a Logical Channel Group basis. Once the reporting is received, the base station (e.g., gNB) will allocate resources and with the resource allocation the base station allocates a HARQ process corresponding to a certain behavior. This procedure will cause additional uplink scheduling delay particularly for networks with long propagation delay such as non-terrestrial networks.

In the following example it assumed that the gNB scheduled some data of a low priority service (or LCH or LCG etc.), but in the meantime high priority data of a different service (or LCG or LCH) arrived at the UE. Following the strict procedure, the UE would not be allowed to send the high priority data but would have to stick to the low priority data for which this specific HARQ behavior was optimized. The UE first would have to send a BSR to the gNB requesting resources for the high priority data. Once this BSR is received, the gNB would allocate HARQ process supporting the high priority LCG. Such high delay is not acceptable for non-terrestrial networks with very high delay.

Therefore, in accordance with embodiments, a high priority service (or LCH or LCG etc.) is allowed to overtake the resource allocation of the low priority service. Furthermore, a new BSR can be added as MAC CE in the data that is being send in the uplink. The base station (e.g., gNB) may also configure the UE with a kind of prioritization which service (or LCH or LCG etc.) supersedes/overwrites which other service (or LCH or LCG etc.). Based on another UE configuration parameter configured by the base station (e.g., gNB) the UE may send the data a second time once the "Intended" uplink resources for the high priority service received or the UE may not send the data a second time. By this, the UE can send high priority data immediately without waiting for another grant to be received. At the same time, a higher reliability can be achieved for this packet (e.g. for control messages) if the UE is allowed to send the packet another time on suitable HARQ processes. So certain high priority services may be allowed to overtake resource allocations of other low priority services. In addition, high reliability services might be sent multiple times using different HARQ processes with different resource allocations to increase their reliability.

Further, in accordance with embodiments, a UCI, uplink control information, side information can be multiplexed into the said PUSCH transmission indicating the presence of high priority traffic which causes the base station (e.g., gNB) to apply the high priority procedure, e.g., sending a grant on a specific HARQ process or enabling a HARQ process dynamically for the specific transmission via PDCCH DCI.

Received Grant for and Uplink Transmission is Larger than Required and Other Data is Pending Due to the approach that all uplink resources are controlled by the scheduler of the base station (e.g., gNB scheduler), it can happen that a too large grant is received by a UE. In regular scheduler this is not a problem, because any service (or LCH or LCG etc.) can be mapped to an uplink resource allocation. In the method described above, there is a fixed mapping of service (or LCH or LCG etc.) to an HARQ process/entity. With this fixed mapping it is not possible to add data from other services (or LCH or LCG etc.) in case there are more resources granted than required. The default approach is to add padding bits, which is not efficient at all from the resource utilization point of view.

Therefore, in accordance with embodiments, other services (or LCH or LCG etc.) are allowed to be multiplexed on this HARQ process(es) even if such mapping was not configured. Which service (or LCH or LCG etc.) is allowed to be multiplexed with another service might be configurable by RRC configuration or fixed in the specification, e.g. based on QoS, priority, delay budget, buffer status, signal measurement thresholds etc.

UE Based Selection of HARQ Behavior (Process Number, New Data Indicator, Redundancy Version)

Usually, the HARQ parameters are selected by the base station (e.g., gNB) and communicated to the UE that has to follow the base stations (e.g., gNBs) decisions. In a regular scheduled uplink transmission this information is provided via the PDCCH Downlink Control Information. For uplink configured grant this is provided by the RRC configuration and derived by a specified formula in the specification or configured by RRC plus dynamic signaling via PDCCH DC. This behavior is not optimum in communication systems with large propagation delay, where only the UE has the best knowledge which data is arrived recently in its buffer.

Thus, in accordance with an embodiment, the UE is provided with some autonomy in selecting the most suitable HARQ behavior. It is realized by defining an algorithm for the UE according to which the decision is being done. The algorithm may consider parameters such as:
  the buffer occupancy,
  the arrival of uplink data,
  the availability of HARQ processes,
  the previous use of HARQ processes,
  the round-trip time of the communication system,
  some service requirements (e.g. latency and error rate) or
    service parameter of the data previously scheduled on
    this HARQ process,
  some service requirements (e.g. latency and error rate) or
    service parameter of the data that is going to be
    scheduled on this HARQ process, time available to transmit a certain packet (For this purpose, the UE may mark each packet with a timer that is started once the packet arrives in the transmission buffer.

In case the transmission timer (time available for transmission) expires, the packet is usually deleted from the transmission buffer and dropped.)

The base station (e.g., gNB) can control the behavior by configuring certain parameters that influence the decision making. This could for instance be a certain threshold of the buffer occupancy for a Logical Channel or a Logical Channel Group. The base station (e.g., gNB) will also configure the number of HARQ processes and certain HARQ behavior that will influence the selection of HARQ transmission parameters.

Depending on some of the above-mentioned criteria, the UE can now autonomously (according to the specified algorithm) decide on the HARQ transmission parameters of the next packet. For instance, the UE may decide to send a new packet or to send a retransmission to the base station or could even overwrite information provided by the base station. Preferred behaviors for different scenarios are described in the following.

According to a first scenario, no new data arrived and an uplink resource allocation/configured grant opportunity is present.

The UE received a scheduled grant, or a configured grant transmit opportunity for a certain HARQ process. In case no new data arrived, the UE will usually follow the base station (e.g., gNB) decision, e.g., to send a retransmission because there is enough time and enough transmit resources available.

Exceptions to this behavior may consider the transmission timer of the respective packet(s). This packet specific timing information is not available at the base station (e.g., gNB). The Buffer Status Reports received by the base station (e.g., gNB) may not be as meaningful in a communication system with large propagation delay.

In case the transmission timer expires, the packet might be deleted and not be retransmitted even if a scheduling grant is received or a configured grant arrives for a retransmission. The UE may replace this packet in favor of a new transmission that is still of relevance to the application. The information, that a retransmission was requested may still be used in the selection of other transmission parameters, e.g., in making the first transmission of the next packet more reliable. This could be done by changing the
  modulation coding scheme,
  the MIMO scheme (e.g. number of users to be multiplexed in MU-MIMO or streams to be multiplexed in SU-MIMO, precoding etc.),
  number of "blind" transmissions (aggregation factor),
  transmit power,
  etc.,
  or any combination thereof.

The receiver, in this case the base station, does not know that the packet is send with different transmission parameters. Therefore, the UE could multiplex this transmission parameters (same as usually transmitted on PDCCH DCI) as Uplink Control Information into the PUSCH data channel. This information is encoded separately from the data and can thus be decoded by the base station (e.g., gNB). The base station (e.g., gNB) will first decode this information and, based on the Uplink Control Information, is able to decode the packets correctly, i.e., with the correct coding/modulation, MIMO scheme etc.

According to a second scenario, no new data arrived and an uplink resource allocation/configured grant opportunity is present.

The UE received a scheduled grant, or a configured grant transmit opportunity for a certain HARQ process. In case no new data arrived, depending on one of the criteria above, the UE might autonomously decide to send a retransmission (e.g., based on the base station (e.g., gNB) scheduling information such as NDI) or to schedule a new packet (e.g., high priority packet). The UE, for this purpose, may overwrite HARQ information from the base station (e.g., gNB). Since new data arrived a more important packet may be selected.

Once again, the receiver, in this case the base station, does not know if the packet is a new transmission or a retransmission on this HARQ process or may even expect another transmission. The UE could multiplex the HARQ New Data Indicator as Uplink Control Information into the PUSCH data channel. This information is encoded separately from the data and can thus be decoded by the base station (e.g., gNB). The base station (e.g., gNB) will first decode this information and, based on the Uplink Control Information, is able to decode the packets correctly, i.e., with or without soft combining, with or without deleting the soft buffer.

Similarly, the UE may itself choose the HARQ process or, if commonly decided by the base station (e.g., gNB), choose another HARQ process instead of the one assigned by the base station (e.g., gNB). Once again, the UE may multiplex this information in the Uplink Control Information to let the base station (e.g., gNB) receive know the HARQ process that has been used.

Also, behavior without associated UCI could be envisioned. In this case the received does not exactly know what UE has selected. The receiver will have to blindly decode the packet and has to apply different options for decoding. For example, in case there is no NDI Uplink Control Information, the receiver does not know if the packet is the same packet (in this case soft combining should take place) or in case the packet is a new packet (in this case the previously stored data should be deleted). The receiver has to blindly apply both options to see if successful decoding is possible. Similarly, the receiver could try to decode with soft combining of different HARQ processes in case the process is not being signaled. The additional effort might take time and consume power, so it may not be the preferred option. Nevertheless, but due to the long propagation delay the processing time may not be as critical.

Uplink Configured Grant Configuration

Conventionally, uplink configured grant is used to support uplink data transmission, e.g., small packets that are regularly transmitted, such as VoIP, while minimizing the PDCCH overhead of the resource allocation. Resources for the UEs are pre-configured by the base station (e.g., gNB) in the uplink at predefined Resource Blocks with pre-defined formats and with a pre-defined periodicity (e.g., 20 ms for VoIP). In case uplink data is available the UE can start transmission on the pre-defined resources without having to read a PDCCH control channel beforehand. There are two types of pre-configured grant. In Type 1 Configured Grant (sometimes also called Grant Free operation) there will be a pre-configuration of resources via RRC signaling only. Resources can be used by the UE immediately without activation/deactivation by PDCCH DCI. In Type 2 Configured Grant a PDCCH control channel in the pre-defined resources could be send using a pre-defined CS-RNTI. This signaling can be used to switch resources on/off semi-persistently.

Figure 18:
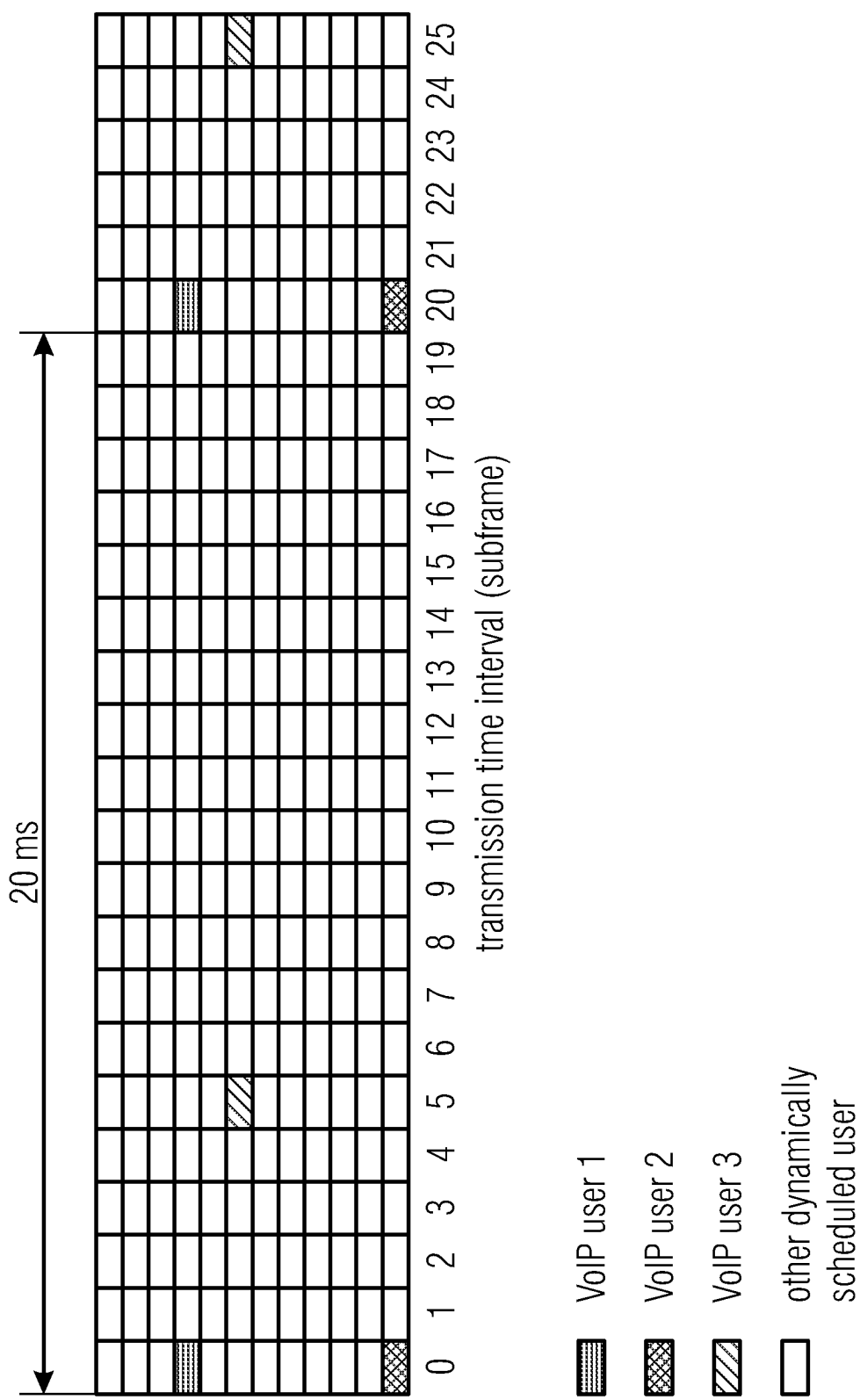
FIG. 18 illustrates in a diagram a transmission time interval (subframe) in VoIP, according to which resources for the UEs are pre-configured by the base station (e.g., gNB) in the uplink at predefined Resource Blocks with pre-defined formats and with a pre-defined periodicity.

FIG. 18 illustrates in a diagram a transmission time interval (subframe) in VoIP, according to which resources for the UEs are pre-configured by the base station (e.g., gNB) in the uplink at predefined Resource Blocks with pre-defined formats and with a pre-defined periodicity.

However, there is the problem that in 4G and 5G uplink configured grant cannot support different types of HARQ behavior. Without this differentiation it is not possible to apply different HARQ behavior to different services or system requirements. Uplink configured grant is very important to communication systems with large propagation delays since the explicit scheduling takes too much time. Therefore, to support of different services (e.g., with different latency and/or error requirements) or different bearer types (e.g., signaling bearer with high importance signaling) required an enhancement of the uplink configured grant to support different types of HARQ behavior.

As previously defined, there is an RRC configuration of HARQ processes with different HARQ behavior beforehand. There is some RRC configuration of the Configured Grant that will be extended for this purpose in accordance with an embodiment. In detail, in accordance with an embodiment, different HARQ behavior can be configured by RRC by assigning specific HARQ processes and HARQ behavior to be used in the Configured Grant configuration. A bitmap of different length could define, which HARQ processes shall be used by this Configured Grant process and which should not be used. In case the number of HARQ processes is very large, the overhead by the bitmap may increase significantly. More advanced signaling methods like block wise process assignment might save some signaling overhead. For each uplink configured also a certain HARQ behavior might be defined. To achieve the intended behavior only HARQ processes of a one behavior should be used. In case a different HARQ behavior is required as well, as second configured grant configuration need to be configured using different HARQ processes.

Further Embodiments

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 19:
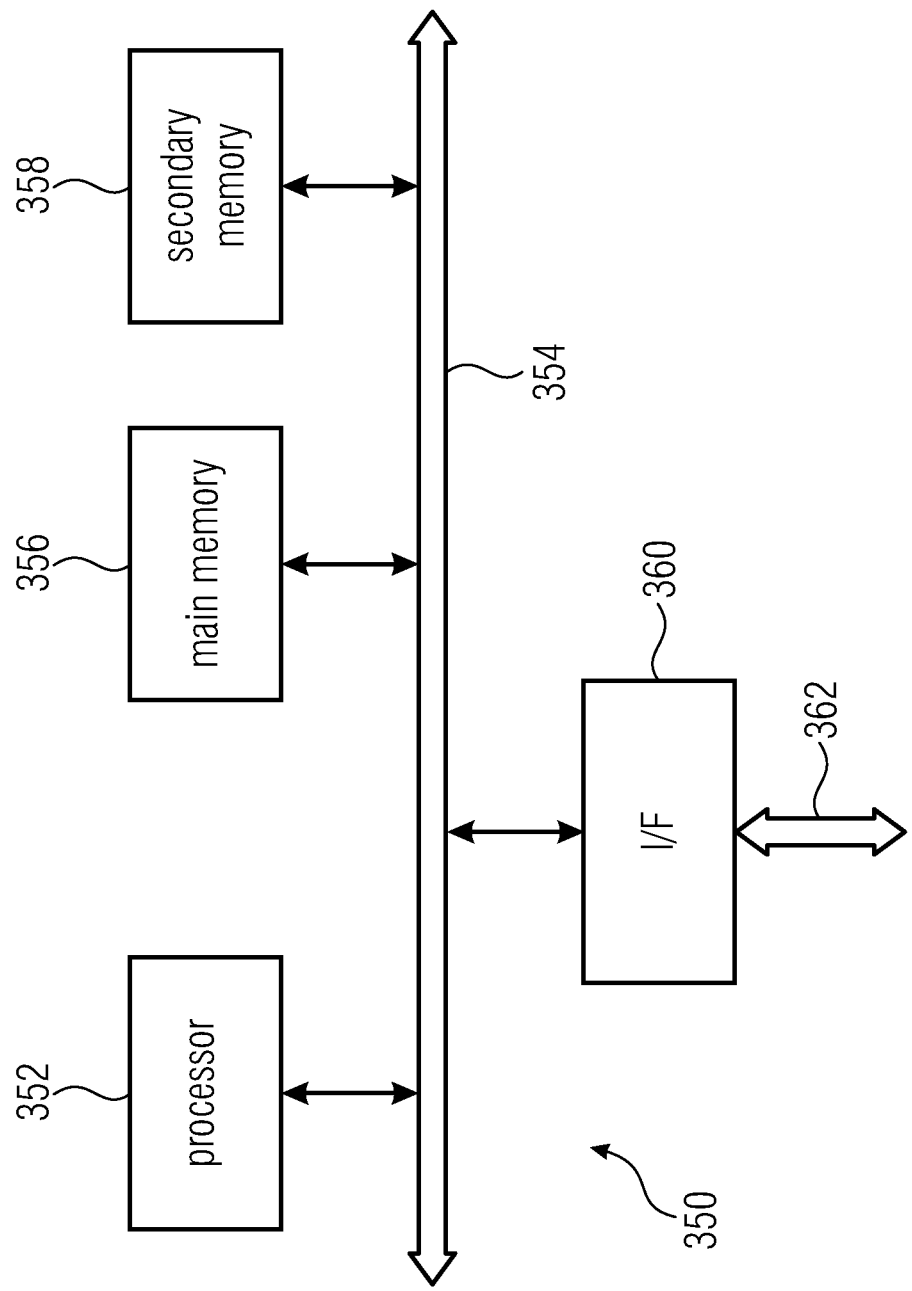
FIG. 19 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 19 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

| | |
|---|---|
| V2X | Vehicle-to-Everything |
| 3GPP | Third Generation Partnership Project |
| D2D | Device-to-Device |
| BS | Base Station |
| eNB | Evolved Node B (3G base station) |
| UE | User Equipment |
| NR | New Radio |

The invention claimed is:

1. An apparatus, wherein the apparatus comprises:
one or more Hybrid Automatic Repeat reQuest (HARQ) entities, and
a transmitter,
wherein the one or more HARQ entities are configured to operate a plurality of HARQ processes,
wherein each HARQ process is associated with one of a plurality of HARQ behaviors,
wherein the transmitter is configured to transmit a control information to a transceiver in a wireless communication system,
wherein the control information is transmitted over a radio channel of the wireless communication system,
wherein the control information provides configuration information for a plurality of sub-frames of a transmission frame,
wherein the configuration information for the plurality of sub-frames includes a HARQ identifier for each sub-frame,
wherein each HARQ identifier identifies one HARQ behavior out of the plurality of HARQ behaviors, and
wherein at least one HARQ behavior of at least one sub-frame differs from at least one other HARQ behavior of at least one other sub-frame in the transmission frame,
wherein the at least one HARQ behavior comprises a corresponding at least one HARQ operation,
wherein the at least one HARQ operation is a retransmission scheme that causes a retransmission without feedback,
wherein the retransmission without feedback includes at least one of: a HARQ blind transmission and a K-repetition scheme transmitting a data packet K times without waiting for feedback.

2. The apparatus of claim 1, wherein the apparatus comprises a plurality of different channels or elements, the plurality of different channels or elements linked to the plurality of sub-frames.

3. The apparatus of claim 2, wherein the plurality of different channels or elements include one or more of: different logical channels, different logical channel groups, different radio link control channels, different packet data convergence protocol channels, different radio bearers, and different quality of service flows.

4. The apparatus of claim 2, wherein two or more of the different channels or elements are linked groupwise to one of the plurality of HARQ behaviors.

5. The apparatus of claim 4,
wherein a portion of the data packets of the different channels or elements are associated with priorities, and
wherein the data packets of the different channels or elements are linked groupwise to a same HARQ behavior based on the priorities.

6. The apparatus of claim 2, wherein, in case that a transmission grant is larger than required for the available data packets of the channel or element that is linked to the HARQ behavior identified by the configuration information, one or more data packets of a channel or element that is linked to a HARQ behavior that is not identified by the configuration information are included in the same frame.

7. The apparatus of claim 2,
wherein the apparatus is configured to transmit one or more data packets to the transceiver in the wireless communication system,
wherein the one or more data packets are one or more data packets of a channel or element that is linked to a particular HARQ behavior,
wherein the apparatus is configured to retransmit a data packet according to the identified HARQ behavior.

8. The apparatus of claim 2, wherein the wireless system comprises two or more user equipments, at least two of the user equipments communicating directly with each other via a sidelink communication while being in connected mode or idle mode or inactive mode, and the apparatus comprises one of the at least two user equipments.

9. The apparatus of claim 1, wherein the configuration information is signaled by one or more of: a radio resource control signaling, a downlink control information, a sidelink control information, and a system information block.

10. The apparatus of claim 1, wherein the apparatus is configured to determine at least a part of the configuration information based on one or more of the following criteria: priority of traffic, quality of service, latency or delay budget, buffer status, transmission history, and configured thresholds.

11. The apparatus of claim 1, wherein each HARQ behavior comprises one or more HARQ operations.

12. The apparatus of claim 11,
wherein the one or more HARQ operations comprise one or more of: a Stop-and-Wait protocol, a window based protocol, a synchronous protocol, and an asynchronous protocol,
wherein the synchronous protocol comprises scheduling one or more retransmissions and/or one or more HARQ ACK/NACKs at pre-defined time instances after an initial transmission, wherein the asynchronous protocol comprises scheduling one or more retransmissions and/or one or more HARQ ACK/NACKs dynamically in time, and wherein the scheduling comprises a retransmission scheme causing a retransmission without feedback.

13. The apparatus of claim 1,
wherein the wireless communication system comprises one or more base stations (BS) and one or more user equipments (UEs), and
wherein the apparatus comprises one of: the one or more base stations, and the one or more UEs.

14. A method comprising:
providing one or more Hybrid Automatic Repeat reQuest (HARQ) entities,
wherein the one or more HARQ entities are configured to operate a plurality of HARQ processes,
wherein each HARQ process is associated with one of a plurality of HARQ behaviors, and
transmitting control information from a transceiver in a wireless communication system,
wherein the control information is transmitted over a radio channel of the wireless communication system,
wherein the control information comprises configuration information for a plurality of sub-frames of a transmission frame,
wherein the configuration information for the plurality of sub-frames includes a HARQ identifier for each sub-frame,
wherein each HARQ identifier identifies one HARQ behavior out of the plurality of HARQ behaviors, and
wherein at least one HARQ behavior of at least one sub-frame differs from at least one other HARQ behavior of at least one other sub-frame in the transmission frame,
wherein the at least one HARQ behavior comprises a corresponding at least one HARQ operation,
wherein the at least one HARQ operation is a retransmission scheme that causes a retransmission without feedback,
wherein the retransmission without feedback includes at least one of: a HARQ blind transmission and a K-repetition scheme transmitting a data packet K times without waiting for feedback.

15. An apparatus comprising:
one or more Hybrid Automatic Repeat reQuest (HARQ) entities,
wherein the one or more HARQ entities are configured to operate a plurality of HARQ processes,
wherein each HARQ process is associated with one of a plurality of HARQ behaviors, and a receiver,
wherein the receiver is configured to receive control information from a transceiver in a wireless communication system,
wherein the control information is transmitted over a radio channel of the wireless communication system,
wherein the control information comprises configuration information for a plurality of sub-frames of a transmission frame,
wherein the configuration information for the plurality of sub-frames includes a HARQ identifier for each sub-frame,
wherein each HARQ identifier identifies one HARQ behavior out of the plurality of HARQ behaviors, and
wherein at least one HARQ behavior of at least one sub-frame differs from at least one other HARQ behavior of at least one other sub-frame in the transmission frame,
wherein the at least one HARQ behavior comprises a corresponding at least one HARQ operation,
wherein the at least one HARQ operation is a retransmission scheme that causes a retransmission without feedback,
wherein the retransmission without feedback includes at least one of: a HARQ blind transmission and a K-repetition scheme transmitting a data packet K times without waiting for feedback.

16. The apparatus of claim 15, wherein the apparatus comprises a plurality of different channels or elements, the plurality of different channels or elements linked to the plurality of sub-frames.

17. The apparatus of claim 16, wherein the plurality of different channels or elements include one or more of: different logical channels, different logical channel groups, different radio link control channels, different packet data convergence protocol channels, different radio bearers, and different quality of service flows.

18. The apparatus of claim 16,
wherein a portion of data packets of the different channels or elements are associated with priorities, and
wherein the data packets of the different channels or elements are linked groupwise to a same HARQ behavior based on the priorities.

19. The apparatus of claim 15, wherein the configuration information is signaled by one or more of: a radio resource control signaling, a downlink control information, a sidelink control information, and a system information block.

20. The apparatus of claim 15, wherein at least a part of the configuration information is based on one or more of the following criteria: priority of traffic, quality of service, latency or delay budget, buffer status, transmission history, and configured thresholds.

* * * * *